United States Patent
Cruz-Hernandez et al.

(10) Patent No.: US 8,917,234 B2
(45) Date of Patent: Dec. 23, 2014

(54) PRODUCTS AND PROCESSES FOR PROVIDING FORCE SENSATIONS IN A USER INTERFACE

(75) Inventors: Juan Manuel Cruz-Hernandez, Montreal (CA); Danny Grant, Montreal (CA); Pedro Gregorio, Verdun (CA); Neil T. Olien, Montreal (CA); Adam C. Braun, Portland, OR (US)

(73) Assignee: Immersion Corporation, San Jose, CA (US)

( * ) Notice: Subject to any disclaimer, the term of this patent is extended or adjusted under 35 U.S.C. 154(b) by 2724 days.

(21) Appl. No.: 10/686,323

(22) Filed: Oct. 15, 2003

(65) Prior Publication Data

US 2004/0145600 A1   Jul. 29, 2004

Related U.S. Application Data

(60) Provisional application No. 60/419,024, filed on Oct. 15, 2002.

(51) Int. Cl.
*G09G 5/00* (2006.01)
*G06F 3/01* (2006.01)
*G06F 3/023* (2006.01)

(52) U.S. Cl.
CPC .............. *G06F 3/016* (2013.01); *G06F 3/0233* (2013.01)
USPC ........................................................ 345/156

(58) Field of Classification Search
CPC ..... G06F 3/0484; G06F 3/0488; G06F 3/011; G06F 3/016
USPC .......... 345/156, 420, 702, 161, 419, 173, 633
See application file for complete search history.

(56) References Cited

U.S. PATENT DOCUMENTS

| | | | |
|---|---|---|---|
| 2,524,782 A | 10/1950 | Ferrar et al. | |
| 2,972,140 A | 2/1961 | Hirsch | |
| 3,157,853 A | 11/1964 | Hirsch | |
| 3,220,121 A | 11/1965 | Cutler | |
| 3,490,059 A | 1/1970 | Paulsen et al. | |
| 3,497,668 A | 2/1970 | Hirsch | |
| 3,517,446 A | 6/1970 | Corlyon et al. | |
| 3,623,046 A | 11/1971 | Scourtes | |

(Continued)

FOREIGN PATENT DOCUMENTS

| DE | 41 40 780 A1 | 9/1992 |
|---|---|---|
| DE | 196 36 779 A1 | 3/1998 |

(Continued)

OTHER PUBLICATIONS

PCT International Search Report dated Jan. 12, 2004.

(Continued)

*Primary Examiner* — Quan-Zhen Wang
*Assistant Examiner* — Calvin C Ma
(74) *Attorney, Agent, or Firm* — Kilpatrick Townsend & Stockton LLP

(57) ABSTRACT

Products and processes for providing haptic feedback in a user interface device are disclosed. In one exemplary embodiment, a process comprises defining a first cell, mapping a first location of a matrix with the defined first cell, and mapping a second location of the matrix with the defined first cell. The first cell comprises a first parameter representing a first haptic effect.

25 Claims, 12 Drawing Sheets

(56) References Cited

U.S. PATENT DOCUMENTS

| | | |
|---|---|---|
| 3,623,064 A | 11/1971 | Kagan |
| 3,875,488 A | 4/1975 | Crocker et al. |
| 3,902,687 A | 9/1975 | Hightower |
| 3,903,614 A | 9/1975 | Diamond et al. |
| 3,911,416 A | 10/1975 | Feder |
| 4,050,265 A | 9/1977 | Drennen et al. |
| 4,103,155 A | 7/1978 | Clark |
| 4,125,800 A | 11/1978 | Jones |
| 4,127,752 A | 11/1978 | Lowthorp |
| 4,148,014 A | 4/1979 | Burson |
| 4,160,508 A | 7/1979 | Salsbury |
| 4,236,325 A | 12/1980 | Hall et al. |
| 4,262,549 A | 4/1981 | Schwellenbach |
| 4,311,980 A | 1/1982 | Prusenziati |
| 4,333,070 A | 6/1982 | Barnes |
| 4,385,836 A | 5/1983 | Schmitt |
| 4,391,282 A | 7/1983 | Ando et al. |
| 4,400,790 A | 8/1983 | Chambers et al. |
| 4,443,952 A | 4/1984 | Schulien et al. |
| 4,464,117 A | 8/1984 | Forest |
| 4,484,191 A | 11/1984 | Vavra |
| 4,513,235 A | 4/1985 | Acklam et al. |
| 4,546,347 A | 10/1985 | Kirsch |
| 4,581,491 A | 4/1986 | Boothroyd |
| 4,599,070 A | 7/1986 | Hladky et al. |
| 4,637,264 A | 1/1987 | Takahashi et al. |
| 4,639,884 A | 1/1987 | Sagues |
| 4,676,115 A | 6/1987 | Morscheck et al. |
| 4,678,908 A | 7/1987 | LaPlante |
| 4,680,466 A | 7/1987 | Kuwahara et al. |
| 4,692,726 A | 9/1987 | Green et al. |
| 4,695,266 A | 9/1987 | Hui |
| 4,699,043 A | 10/1987 | Violante De Dionigi |
| 4,708,656 A | 11/1987 | De Vries et al. |
| 4,712,101 A | 12/1987 | Culver |
| 4,713,007 A | 12/1987 | Alban |
| 4,724,715 A | 2/1988 | Culver |
| 4,728,954 A | 3/1988 | Phelan et al. |
| 4,734,685 A | 3/1988 | Watanabe |
| 4,758,165 A | 7/1988 | Tieman et al. |
| 4,772,205 A | 9/1988 | Chlumsky et al. |
| 4,776,701 A | 10/1988 | Pettigrew |
| 4,794,384 A | 12/1988 | Jackson |
| 4,794,392 A | 12/1988 | Selinko |
| 4,795,907 A | 1/1989 | Maekawa |
| 4,799,055 A | 1/1989 | Nestler et al. |
| 4,803,413 A | 2/1989 | Kendig et al. |
| 4,811,608 A | 3/1989 | Hilton |
| 4,815,006 A | 3/1989 | Andersson et al. |
| 4,819,195 A | 4/1989 | Bell et al. |
| 4,823,106 A | 4/1989 | Lovell |
| 4,825,157 A | 4/1989 | Mikan |
| 4,840,634 A | 6/1989 | Muller et al. |
| 4,851,771 A | 7/1989 | Ikeda et al. |
| 4,860,051 A | 8/1989 | Taniguchi et al. |
| 4,885,565 A | 12/1989 | Embach |
| 4,891,764 A | 1/1990 | McIntosh |
| 4,891,889 A | 1/1990 | Tomelleri |
| 4,906,843 A | 3/1990 | Jones et al. |
| 4,914,976 A | 4/1990 | Wyllie |
| 4,926,879 A | 5/1990 | Sevrain et al. |
| 4,930,770 A | 6/1990 | Baker |
| 4,934,694 A | 6/1990 | McIntosh |
| 4,935,725 A | 6/1990 | Turnau |
| 4,935,728 A | 6/1990 | Kley |
| 4,937,685 A | 6/1990 | Barker et al. |
| 4,940,234 A | 7/1990 | Ishida et al. |
| 4,949,119 A | 8/1990 | Moncrief et al. |
| 4,962,448 A | 10/1990 | DeMaio et al. |
| 4,964,837 A | 10/1990 | Collier |
| 4,965,446 A | 10/1990 | Vyse |
| 4,982,504 A | 1/1991 | Soderberg et al. |
| 5,006,703 A | 4/1991 | Shikunami et al. |
| 5,019,761 A | 5/1991 | Kraft |
| 5,022,384 A | 6/1991 | Freels |
| 5,022,407 A | 6/1991 | Horch et al. |
| 5,024,626 A | 6/1991 | Robbins et al. |
| 5,035,242 A | 7/1991 | Franklin |
| 5,038,089 A | 8/1991 | Szakaly |
| 5,053,975 A | 10/1991 | Tsuchihashi et al. |
| 5,062,830 A | 11/1991 | Dunlap |
| 5,065,145 A | 11/1991 | Purcell |
| 5,068,529 A | 11/1991 | Ohno et al. |
| 5,078,152 A | 1/1992 | Bond |
| 5,079,845 A | 1/1992 | Childers |
| 5,086,197 A | 2/1992 | Liou |
| 5,095,303 A | 3/1992 | Clark et al. |
| 5,107,080 A | 4/1992 | Rosen |
| 5,113,179 A | 5/1992 | Scott-Jackson et al. |
| 5,116,051 A | 5/1992 | Moncrief et al. |
| 5,121,091 A | 6/1992 | Fujiyama |
| 5,125,281 A | 6/1992 | Mottate |
| 5,132,927 A | 7/1992 | Lenoski et al. |
| 5,138,154 A | 8/1992 | Hotelling |
| 5,139,261 A | 8/1992 | Openiano |
| 5,148,377 A | 9/1992 | McDonald |
| 5,155,423 A | 10/1992 | Karlen et al. |
| 5,165,897 A | 11/1992 | Johnson |
| 5,168,268 A | 12/1992 | Levy |
| 5,175,459 A | 12/1992 | Danial et al. |
| 5,182,557 A | 1/1993 | Lang |
| 5,186,695 A | 2/1993 | Mangseth et al. |
| 5,195,179 A | 3/1993 | Tokunaga |
| 5,195,920 A | 3/1993 | Collier |
| 5,202,961 A | 4/1993 | Mills et al. |
| 5,204,600 A | 4/1993 | Kahkoska |
| 5,209,131 A | 5/1993 | Baxter |
| 5,212,473 A | 5/1993 | Louis |
| 5,216,337 A | 6/1993 | Orton et al. |
| 5,223,658 A | 6/1993 | Suzuki |
| 5,229,836 A | 7/1993 | Nagano |
| 5,230,623 A | 7/1993 | Guthrie et al. |
| 5,235,868 A | 8/1993 | Culver |
| 5,239,249 A | 8/1993 | Ono |
| 5,240,417 A | 8/1993 | Smithson et al. |
| 5,246,316 A | 9/1993 | Smith |
| 5,247,648 A | 9/1993 | Watkins et al. |
| 5,254,919 A | 10/1993 | Bridges et al. |
| 5,271,290 A | 12/1993 | Fischer |
| 5,275,174 A | 1/1994 | Cook |
| 5,275,565 A | 1/1994 | Moncrief |
| 5,280,276 A | 1/1994 | Kwok |
| 5,283,970 A | 2/1994 | Aigner |
| 5,284,330 A | 2/1994 | Carlson et al. |
| 5,289,273 A | 2/1994 | Lang |
| 5,296,846 A | 3/1994 | Ledley |
| 5,299,810 A | 4/1994 | Pierce |
| 5,302,132 A | 4/1994 | Corder |
| 5,309,140 A | 5/1994 | Everett, Jr. et al. |
| 5,313,229 A | 5/1994 | Gilligan et al. |
| 5,313,230 A | 5/1994 | Venolia et al. |
| 5,317,336 A | 5/1994 | Hall |
| 5,329,289 A | 7/1994 | Sakamoto et al. |
| 5,334,027 A | 8/1994 | Wherlock |
| 5,341,459 A | 8/1994 | Backes |
| 5,351,692 A | 10/1994 | Dow et al. |
| 5,359,193 A | 10/1994 | Nyui et al. |
| 5,374,942 A | 12/1994 | Gilligan et al. |
| 5,379,663 A | 1/1995 | Hara |
| 5,384,460 A | 1/1995 | Tseng |
| 5,389,849 A | 2/1995 | Asano et al. |
| 5,390,128 A | 2/1995 | Ryan et al. |
| 5,390,296 A | 2/1995 | Crandall et al. |
| 5,396,267 A | 3/1995 | Bouton |
| 5,397,323 A | 3/1995 | Taylor et al. |
| 5,398,044 A | 3/1995 | Hill |
| 5,402,499 A | 3/1995 | Robison et al. |
| 5,402,582 A | 4/1995 | Raab |
| 5,402,680 A | 4/1995 | Korenaga |
| 5,414,337 A | 5/1995 | Schuler |
| 5,417,696 A | 5/1995 | Kashuba et al. |
| 5,428,746 A | 6/1995 | Dalrymple |
| 5,436,542 A | 7/1995 | Petelin et al. |
| 5,436,622 A | 7/1995 | Gutman et al. |

(56) References Cited

U.S. PATENT DOCUMENTS

| | | |
|---|---|---|
| 5,436,640 A | 7/1995 | Reeves |
| 5,437,607 A | 8/1995 | Taylor |
| 5,452,615 A | 9/1995 | Hilton |
| 5,457,479 A | 10/1995 | Cheng |
| 5,457,793 A | 10/1995 | Elko et al. |
| 5,461,711 A | 10/1995 | Wang et al. |
| 5,466,213 A | 11/1995 | Hogan |
| 5,467,763 A | 11/1995 | McMahon et al. |
| 5,473,344 A | 12/1995 | Bacon et al. |
| 5,474,082 A | 12/1995 | Junker |
| 5,481,914 A | 1/1996 | Ward |
| 5,491,477 A | 2/1996 | Clark et al. |
| 5,512,919 A | 4/1996 | Araki |
| 5,514,150 A | 5/1996 | Rostoker |
| 5,524,195 A | 6/1996 | Clanton, III et al. |
| 5,526,022 A | 6/1996 | Donahue et al. |
| 5,530,455 A | 6/1996 | Gillick et al. |
| 5,543,821 A | 8/1996 | Marchis et al. |
| 5,547,382 A | 8/1996 | Yamasaki |
| 5,547,383 A | 8/1996 | Yamaguchi |
| 5,550,562 A | 8/1996 | Aoki et al. |
| 5,550,583 A | 8/1996 | Matheny et al. |
| 5,565,840 A | 10/1996 | Thorner et al. |
| 5,570,111 A | 10/1996 | Barrett et al. |
| 5,575,761 A | 11/1996 | Hajianpour |
| 5,576,727 A | 11/1996 | Rosenberg et al. |
| 5,583,407 A | 12/1996 | Yamaguchi |
| 5,591,924 A | 1/1997 | Hilton |
| 5,592,401 A | 1/1997 | Kramer |
| 5,600,777 A | 2/1997 | Wang et al. |
| 5,604,345 A | 2/1997 | Matsuura |
| 5,611,731 A | 3/1997 | Bouton et al. |
| 5,623,582 A | 4/1997 | Rosenberg |
| 5,623,642 A | 4/1997 | Katz et al. |
| 5,627,531 A | 5/1997 | Posso et al. |
| 5,628,686 A | 5/1997 | Svancarek et al. |
| 5,635,897 A | 6/1997 | Kuo |
| 5,638,060 A | 6/1997 | Kataoka et al. |
| 5,638,421 A | 6/1997 | Serrano et al. |
| 5,652,603 A | 7/1997 | Abrams |
| 5,666,138 A | 9/1997 | Culver |
| 5,680,141 A | 10/1997 | Didomenico et al. |
| 5,690,582 A | 11/1997 | Ulrich et al. |
| 5,691,747 A | 11/1997 | Amano |
| 5,691,898 A | 11/1997 | Rosenberg et al. |
| 5,694,153 A | 12/1997 | Aoyagi et al. |
| 5,719,561 A | 2/1998 | Gonzales |
| 5,722,071 A | 2/1998 | Berg et al. |
| 5,724,106 A | 3/1998 | Autry et al. |
| 5,724,264 A | 3/1998 | Rosenberg et al. |
| 5,734,108 A | 3/1998 | Walker et al. |
| 5,736,978 A | 4/1998 | Hasser et al. |
| 5,740,083 A | 4/1998 | Anderson et al. |
| 5,745,057 A | 4/1998 | Sasaki et al. |
| 5,749,577 A | 5/1998 | Couch et al. |
| 5,755,620 A | 5/1998 | Yamamoto et al. |
| 5,763,874 A | 6/1998 | Luciano et al. |
| 5,766,016 A | 6/1998 | Sinclair |
| 5,767,836 A | 6/1998 | Scheffer et al. |
| 5,771,037 A | 6/1998 | Jackson |
| 5,785,630 A | 7/1998 | Bobick et al. |
| 5,795,228 A | 8/1998 | Trumbull et al. |
| 5,808,568 A | 9/1998 | Wu |
| 5,808,603 A | 9/1998 | Chen |
| 5,818,426 A | 10/1998 | Tierney et al. |
| 5,825,305 A | 10/1998 | Biferno |
| 5,828,295 A | 10/1998 | Mittel et al. |
| 5,831,593 A | 11/1998 | Rutledge |
| 5,841,133 A | 11/1998 | Omi |
| 5,841,423 A | 11/1998 | Carroll, Jr. et al. |
| 5,841,428 A | 11/1998 | Jaeger et al. |
| 5,844,673 A | 12/1998 | Ivers |
| 5,877,748 A | 3/1999 | Redlich |
| 5,879,327 A | 3/1999 | Moreau DeFarges et al. |
| 5,887,995 A | 3/1999 | Holehan |
| 5,889,506 A | 3/1999 | Lopresti et al. |
| 5,912,661 A | 6/1999 | Siddiqui |
| 5,917,486 A | 6/1999 | Rylander |
| 5,917,906 A | 6/1999 | Thronton |
| 5,919,159 A | 7/1999 | Lilley et al. |
| 5,929,607 A | 7/1999 | Rosenburg et al. |
| 5,936,613 A | 8/1999 | Jaeger et al. |
| 5,954,689 A | 9/1999 | Poulsen |
| 5,963,196 A | 10/1999 | Nishiumi et al. |
| 5,977,867 A | 11/1999 | Blouin |
| 5,986,638 A | 11/1999 | Cheng |
| 6,008,800 A | 12/1999 | Pryor |
| 6,017,273 A | 1/2000 | Pelkey |
| 6,031,222 A | 2/2000 | Carapelli |
| 6,067,077 A | 5/2000 | Martin et al. |
| 6,067,081 A | 5/2000 | Hahlganss et al. |
| 6,078,311 A | 6/2000 | Pelkey |
| 6,078,876 A | 6/2000 | Rosenberg et al. |
| 6,081,536 A | 6/2000 | Gorsuch et al. |
| 6,084,587 A * | 7/2000 | Tarr et al. .................. 345/419 |
| 6,097,499 A | 8/2000 | Casey et al. |
| 6,097,964 A | 8/2000 | Nuovo et al. |
| 6,104,379 A | 8/2000 | Petrich et al. |
| 6,111,577 A | 8/2000 | Zilles et al. |
| 6,118,435 A | 9/2000 | Fujita et al. |
| 6,140,987 A | 10/2000 | Stein et al. |
| 6,151,332 A | 11/2000 | Gorsuch et al. |
| 6,154,201 A | 11/2000 | Levin et al. |
| 6,160,489 A | 12/2000 | Perry et al. |
| 6,169,540 B1 | 1/2001 | Rosenberg et al. |
| 6,183,364 B1 | 2/2001 | Trovato |
| 6,192,432 B1 | 2/2001 | Slivka et al. |
| 6,198,206 B1 | 3/2001 | Saarmaa et al. |
| 6,215,778 B1 | 4/2001 | Lomp et al. |
| 6,218,966 B1 | 4/2001 | Goodwin et al. |
| 6,219,034 B1 | 4/2001 | Elbing et al. |
| 6,236,647 B1 | 5/2001 | Amalfitano |
| 6,241,574 B1 | 6/2001 | Helbing |
| 6,243,080 B1 | 6/2001 | Molne |
| 6,256,011 B1 | 7/2001 | Culver |
| 6,259,433 B1 | 7/2001 | Meyers |
| 6,262,717 B1 | 7/2001 | Donohue et al. |
| 6,280,327 B1 | 8/2001 | Leifer et al. |
| 6,285,351 B1 | 9/2001 | Chang et al. |
| 6,293,798 B1 | 9/2001 | Boyle et al. |
| 6,295,608 B1 | 9/2001 | Parkes et al. |
| 6,300,038 B1 | 10/2001 | Shimazu et al. |
| 6,307,465 B1 | 10/2001 | Kayma et al. |
| 6,324,928 B1 | 12/2001 | Hughes |
| 6,326,901 B1 | 12/2001 | Gonzales |
| 6,337,678 B1 | 1/2002 | Fish |
| 6,349,301 B1 | 2/2002 | Mitchell et al. |
| 6,373,463 B1 | 4/2002 | Beeks |
| 6,388,655 B1 | 5/2002 | Leung |
| 6,388,999 B1 | 5/2002 | Gorsuch et al. |
| 6,414,674 B1 | 7/2002 | Kamper et al. |
| 6,418,329 B1 | 7/2002 | Furuya |
| 6,422,941 B1 | 7/2002 | Thorner et al. |
| 6,429,846 B2 | 8/2002 | Rosenberg et al. |
| 6,445,284 B1 | 9/2002 | Cruz-Hernandez et al. |
| 6,469,695 B1 | 10/2002 | White |
| 6,487,421 B2 | 11/2002 | Hess et al. |
| 6,509,892 B1 | 1/2003 | Cooper et al. |
| 6,518,958 B1 | 2/2003 | Miyajima et al. |
| 6,535,201 B1 | 3/2003 | Cooper et al. |
| 6,546,390 B1 | 4/2003 | Pollack et al. |
| 6,563,487 B2 * | 5/2003 | Martin et al. ............... 345/156 |
| 6,590,568 B1 | 7/2003 | Astala et al. |
| 6,613,000 B1 * | 9/2003 | Reinkensmeyer et al. ... 600/587 |
| 6,628,195 B1 | 9/2003 | Coudon |
| 6,633,224 B1 | 10/2003 | Hishida et al. |
| 6,636,202 B2 | 10/2003 | Ishmael, Jr. et al. |
| 6,637,281 B2 | 10/2003 | Yamamoto |
| 6,639,582 B1 | 10/2003 | Shrader |
| 6,647,145 B1 | 11/2003 | Gay |
| 6,760,751 B1 | 7/2004 | Hachiya et al. |
| 6,819,312 B2 * | 11/2004 | Fish ............................ 345/156 |
| 6,904,823 B2 | 6/2005 | Levin et al. |
| 6,954,899 B1 * | 10/2005 | Anderson ................... 715/701 |

(56) References Cited

U.S. PATENT DOCUMENTS

| | | | |
|---|---|---|---|
| 7,038,667 B1* | 5/2006 | Vassallo et al. | 345/184 |
| 7,081,883 B2* | 7/2006 | Chen | 345/163 |
| 7,104,152 B2 | 9/2006 | Levin et al. | |
| 7,650,810 B2 | 1/2010 | Levin et al. | |
| 2001/0018354 A1 | 8/2001 | Pigni | |
| 2001/0035854 A1 | 11/2001 | Rosenberg et al. | |
| 2001/0045978 A1 | 11/2001 | McConnell et al. | |
| 2002/0020236 A1 | 2/2002 | Onodera | |
| 2002/0021282 A1 | 2/2002 | Masudaya | |
| 2002/0033795 A1 | 3/2002 | Shahoian et al. | |
| 2002/0072674 A1 | 6/2002 | Criton et al. | |
| 2002/0142701 A1* | 10/2002 | Rosenberg | 446/454 |
| 2002/0149561 A1 | 10/2002 | Fukumoto et al. | |
| 2002/0149570 A1 | 10/2002 | Knowles et al. | |
| 2002/0156807 A1 | 10/2002 | Dieberger | |
| 2003/0006892 A1 | 1/2003 | Church | |
| 2003/0016211 A1 | 1/2003 | Woolley | |
| 2003/0022701 A1 | 1/2003 | Gupta | |
| 2003/0025679 A1 | 2/2003 | Taylor et al. | |
| 2003/0030628 A1 | 2/2003 | Sato et al. | |
| 2003/0038776 A1 | 2/2003 | Rosenberg et al. | |
| 2003/0043206 A1 | 3/2003 | Duarte | |
| 2003/0048260 A1 | 3/2003 | Matusis | |
| 2003/0058265 A1 | 3/2003 | Robinson et al. | |
| 2003/0067449 A1 | 4/2003 | Yoshikawa et al. | |
| 2003/0071795 A1 | 4/2003 | Baldauf et al. | |
| 2003/0090460 A1 | 5/2003 | Schena et al. | |
| 2003/0095105 A1 | 5/2003 | Vaananen | |
| 2003/0112269 A1 | 6/2003 | Lentz et al. | |
| 2003/0128191 A1 | 7/2003 | Strasser et al. | |
| 2003/0128192 A1 | 7/2003 | van Os | |
| 2003/0151597 A1 | 8/2003 | Roberts et al. | |
| 2003/0172757 A1 | 9/2003 | Yone | |
| 2003/0174121 A1 | 9/2003 | Poupyrev et al. | |
| 2003/0179190 A1 | 9/2003 | Franzen | |
| 2003/0188594 A1 | 10/2003 | Levin et al. | |
| 2004/0076444 A1 | 4/2004 | Badovinac et al. | |
| 2004/0193393 A1 | 9/2004 | Keane | |
| 2005/0109145 A1 | 5/2005 | Levin et al. | |
| 2005/0187747 A1 | 8/2005 | Paxson et al. | |

FOREIGN PATENT DOCUMENTS

| | | |
|---|---|---|
| EP | 0 085 518 B1 | 8/1989 |
| EP | 0349086 | 1/1990 |
| EP | 0 265 086 B1 | 7/1990 |
| EP | 0 470 257 A1 | 2/1992 |
| EP | 0 358 989 B1 | 7/1994 |
| EP | 0556999 B1 | 5/1998 |
| EP | 1182851 A1 | 2/2002 |
| EP | 0 875 819 B1 | 10/2002 |
| GB | 569136 | 5/1945 |
| GB | 1 291 271 | 10/1972 |
| GB | 1 372 412 | 10/1974 |
| GB | 2 237 160 A | 4/1991 |
| GB | 2 347 199 A | 8/2000 |
| JP | 01-003664 | 7/1990 |
| JP | 02-109714 | 1/1992 |
| JP | 04-007371 | 8/1993 |
| JP | 5-231509 | 9/1993 |
| JP | 05-193862 | 1/1995 |
| JP | 11-078576 | 3/1999 |
| JP | 2001-350592 A | 12/2001 |
| JP | 2002-02944 | 2/2002 |
| JP | 2002-09756 | 2/2002 |
| JP | 2002-259059 A | 9/2002 |
| JP | 2003-260948 | 9/2003 |
| JP | 2004-511739 | 4/2004 |
| WO | WO 96/16397 | 5/1996 |
| WO | WO 96/24398 | 8/1996 |
| WO | WO 96/32679 | 10/1996 |
| WO | WO 97/18546 A1 | 5/1997 |
| WO | WO 00/26891 | 5/2000 |
| WO | WO 00/77689 A1 | 12/2000 |
| WO | WO 01/00630 A1 | 1/2001 |
| WO | WO 01/67297 A1 | 9/2001 |
| WO | WO 02/12991 A1 | 2/2002 |
| WO | WO 02/27645 | 4/2002 |
| WO | WO 02/31807 A1 | 4/2002 |
| WO | WO 02/33290 | 4/2002 |
| WO | WO 03/000319 A1 | 1/2003 |
| WO | WO 03/085481 | 10/2003 |

OTHER PUBLICATIONS

Lindemann, R.W. and Templemann, J.N., Vibrotactile Feedback for Handling Virtual Contact in Immersive Virtual Environments, in *Usability Evaluation and Interlace Design: Cognitive Engineering, Intelligent Agents and Virtual Reality*, Smith, M.J., Salvendy, G., Harris, D., and Koubek, R.J. (Eds.) 2001, pp. 21-25.
Lindemann, R.W., Templemann, J.N., Sibert, J.L. and Cutler, J.R., Handling of Virtual Contact in Immersive Virtual Environments: Beyond Visuals, *Virtual Reality* (2002) 6:130-139.
Partial PCT International Search Report dated Sep. 2, 2004.
Lake, "Cyberman From Logitech," GameBytes, 1994.
Noll, ."Man-Machine Tactile," SID Journal, Jul./Aug. 1972 Issue.
Rosenberg, Virtual Fixtures: Perceptual Overlays Enhance Operator Performance in Telepresence Tasks, Ph.D. Dissertation, Stanford University, Jun. 1994.
Yamakita et al., "Tele-Virtual Reality of Dynamic Mechanical Model," Proceedings of the 1992 IEEE/RSJ International Conference on Intelligent Robots and Systems, Raleigh, NC, Jul. 7-10, 1992.
Patent Office of Peoples Republic of China, First Office Action, Chinese Patent Application No. 03807822, dated Feb. 2, 2007.
Shobayashi International Patent and Trademark Office, Office Action, Japanese Patent Application No. 2003-582601, mailed Dec. 10, 2008.
Japanese Patent Office, Decision of Dismissal of Amendment, Japanese Application No. 2003-582601, dated Jan. 15, 2008.
Shobayashi International Patent and Trademark Office, Notice of Reasons of Rejection, Japanese Patent Application No. 2003-582601, dated Apr. 21, 2009.
Patent Office of Peoples Republic of China, Second Office Action, Chinese Patent Application No. 03807822, dated Apr. 28, 2009.
Shobayashi International Patent and Trademark Office, Notice of Reasons of Rejection, Japanese Patent Application No. 2003-582601, dated Feb. 27, 2007.
Shobayashi International Patent and Trademark Office, Notice of Reasons of Rejection, Japanese Patent Application No. 2003-582601, dated May 30, 2006.
KIPOS Notice of Preliminary Rejection, Korean Patent Application No. 10-2004-7015606, dated Jun. 4, 2010.
KIPOS Notice of Preliminary Rejection, Korean Patent Application No. 10-2004-7015606, dated Jul. 10, 2009.
Adelstein, "A Virtual Environment System for the Study of Human Arm Tremor," Ph.D. Dissertation, Dept. of Mechanical Engineering, MIT, Jun. 1989.
Adelstein, "Design and Implementation of a Force Reflecting Manipulandum for Manual Control research," DSC-vol. 42, Advances in Robotics, Edited by H. Kazerooni, pp. 1-12, 1992.
Aukstakalnis et al., "Silicon Mirage: The Art and Science of Virtual Reality," ISBN 0-938151-82-7, pp. 129-180, 1992.
Baigrie, "Electric Control Loading—A Low Cost, High Performance Alternative," Proceedings, pp. 247-254, Nov. 6-8, 1990.
Bejczy et al., "Kinesthetic Coupling Between Operator and Remote Manipulator," International Computer Technology Conference, the American Society of Mechanical Engineers, San Francisco, CA, Aug. 12-15, 1980.
Bejczy, "Sensors, Controls, and Man-Machine Interface for Advanced Teleoperation," Science, vol. 208, No. 4450, pp. 1327-1335, 1980.
Bejczy, "Generalization of Bilateral Force-Reflecting Control of Manipulators," Proceedings of Fourth CISM-IFToMM, Sep. 8-12, 1981.
Bejczy, et al., "Universal Computer Control System (UCCS) for Space Telerobots," CH2413-3/87/0000/0318501.00 1987 IEEE, 1987.

(56) References Cited

OTHER PUBLICATIONS

Bejczy et al., "A Laboratory Breadboard System for Dual-Arm Teleoperation," SOAR '89 Workshop, JSC, Houston, TX, Jul. 25-27, 1989.
Bliss, "Optical-to-Tactile Image Conversion for the Blind," IEEE Transactions on Man-Machine Systems, vol. MMS-11, No. 1, Mar. 1970.
Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.
Cadler, "Design of a Force-Feedback Touch-Introducing Actuator for Teleoperator Robot Control," Bachelor of Science Thesis, MIT, Jun. 23, 1983.
Caldwell et al., "Enhanced Tactile Feedback (Tele-Taction) Using a Multi-Functional Sensory System," 1050-4729/93, pp. 955-960, 1993.
"Cyberman Technical Specification," Logitech Cyberman SWIFT Supplement, Apr. 5, 1994.
Eberhardt et al., "OMAR—A Haptic display for speech perception by deaf and deaf-blind individuals," IEEE Virtual Reality Annual International Symposium, Seattle, WA, Sep. 18-22, 1993.
Eberhardt et al., "Including Dynamic Haptic Perception by the Hand: System Description and Some Results," DSC-vol. 55-1, Dynamic Systems and Control: vol. 1, ASME 1994.
Fokumoto, "Active Click: Tactile Feedback for Touch Panels," ACM CHI2001 Extended Abstracts, pp. 121-122, Apr. 2001.
Force Feedback Touch Panel, Represented by CSC Division, Sales Department., SIXIK Corporation, Tokyo, Japan, www.smk.co.jp.
Gobel et al., "Tactile Feedback Applied to Computer Mice," International Journal of Human-Computer Interaction, vol. 7, No. 1, pp. 1-24, 1995.
Gotow et al., "Controlled Impedance Test Apparatus for Studying Human Interpretation of Kinesthetic Feedback," WA11-11:00, pp. 332-337, 1989.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
IBM Technical Disclosure Bulletin, "Mouse Ball-Actuating Device With Force and Tactile Feedback," vol. 32, No. 9B, Feb. 1990.
Iwata, "Pen-based Haptic Virtual Environment," 0-7803-1363-1/93 IEEE, pp. 287-292, 1993.
Jacobsen et al., "High Performance, Dextrous Telerobotic Manipulator With Force Reflection," Intervention/ROV '91 Conference & Exposition, Hollywood, Florida, May 21-23, 1991.
Johnson, "Shape-Memory Alloy Tactile Feedback Actuator," Armstrong Aerospace Medical Research Laboratory, AAMRL-TR-90-039, Aug. 1990.
Jones et al., "A perceptual analysis of stiffness," ISSN 0014-4819 Springer International (Springer-Verlag); Experimental Brain Research, vol. 79, No. 1, pp. 150-156, 1990.
Kaczmarek et al., "Tactile Displays," Virtual Environment Technologies, 1995.
Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Kontarinis et al., "Tactile Display of Vibratory Information in Teleoperation and Virtual Environments," PRESENCE, 4(4):387-402, 1995.
Marcus, "Touch Feedback in Surgery," Proceedings of Virtual Reality and Medicine the Cutting Edge, Sep. 8-11, 1994.
McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.
Minsky, "Computational Haptics: The Sandpaper System for Synthesizing Texture for a Force-Feedback Display," Ph.D. Dissertation, MIT, Jun. 1995.
Ouh-Young, "Force Display in Molecular Docking," Order No. 9034744, p. 1-369, 1990.
Ouh-Young, "A Low-Cost Force Feedback Joystick and its Use in PC Video Games," IEEE Transactions on Consumer Electronics, vol. 41, No. 3, Aug. 1995.
Ouhyoung et al., "The Development of a Low-Cost Force Feedback Joystick and its Use in the Virtual Reality Environment," Proceedings of the Third Pacific Conference on Computer Graphics and Applications, Pacific Graphics '95, Seoul, Korea, Aug. 21-24, 1995.
Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.
Patrick, "Design, Construction, and Testing of a Fingertip Tactile Display for Interaction with Virtual and Remote Environments," Master of Science Thesis, MIT, Nov. 8, 1990.
Pimentel et al., "Virtual Reality: through the new looking glass," $2^{nd}$ Edition; McGraw-Hill, ISBN 0-07-050167-X, pp. 41-202, 1994.
Rabinowitz et al., "Multidimensional tactile displays: Identification of vibratory intensity, frequency, and contactor area," Journal of the Acoustical Society of America, vol. 82, No. 4, Oct. 1987.
Russo, "The Design and Implementation of a Three Degree of Freedom Force Output Joystick," MIT Libraries Archives Aug. 14, 1990, pp. 1-131, May 1990.
Russo, "Controlling Dissipative Magnetic Particle Brakes in Force Reflective Devices," DSC-vol. 42, Advances in Robotics, pp. 63-70, ASME 1992.
Safe Flight Instruments Corporation, "Coaxial Control Shaker," Part No. C-25502, Jul. 1, 1967.
Scannell, "Taking a Joystick Ride," Computer Currents, Boston Edition, vol. 9, No. 11, Nov. 1994.
Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.
SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.
SMK Corporation, "Force Feedback Type Optical Touch Panel Developed," SMK Corporation Website, Oct. 30, 2002.
Snow et al., "Model-X Force-Reflecting-Hand-Controller," NT Control No. MPO-17851; JPL Case No. 5348, pp. 1-4, Jun. 15, 1989.
Stanley et al., "Computer Simulation of Interacting Dynamic Mechanical Systems Using Distributed Memory Parallel Processors," DSC-vol. 42, Advances in Robotics, pp. 55-61, ASME 1992.
Tadros, "Control System Design for a Three Degree of Freedom Virtual Environment Simulator Using Motor/Brake Pair Actuators", MIT Archive © Massachusetts Institute of Technology, pp. 1-88, Feb. 1990.
Terry et al., "Tactile Feedback in a Computer Mouse," Proceedings of Fourteenth Annual Northeast Bioengineering Conference, University of New Hampshire, Mar. 10-11, 1988.
Wiker, "Teletouch Display Development: Phase 1 Report," Technical Report 1230, Naval Ocean Systems Center, San Diego, Apr. 17, 1989.
Adelstein, B., A Virtual Environment System for the Study of Human Arm Tremor, Submitted to the Dept. of Mechanical Engineering in partial fulfillment of the requirements for the degree of Doctor of Philosophy at the Massachusetts Institute of Technology, Jun. 1989, pp. 1-253.
Adelstein, B. et al., Design and Implementation of a Force Reflecting Manipulandum for Manual Control Research, DSC-vol. 42, Advances in Robotics, ASME 1992, pp. 1-12.
Akamatsu et al., Multimodal Mouse: A Mouse-Type Device with Tactile and Force Display, Presence, vol. 3, No. 1 pp. 73-80, 1994.
ATIP9B.059: Virtual Reality (VR) Development at SERI (Korea), Asian Technology Information Program (ATIP) Jul. 20, 1996, pp. 1-9.
Aukstakalnis, S. et al., The Art and Science of Virtual Reality Silicon Mirage, 1992, Peachpit Press, Inc., Berkeley, CA, pp. 129-180.

(56) References Cited

OTHER PUBLICATIONS

Baigrie, S. et al., Electric Control Loading-A Low Cost, High Performance Alternative, Proceedings, Nov. 6-8, 1990, pp. 247-254.
Bejczy, A., Sensors, Controls, and Man-Machine Interface for Advanced Teleoperation, Science, vol. 208, No. 4450, 1980, pp. 1327-1335.
Bejczy, A. et al., Kinesthetic Coupling Between Operator and Remote Manipulator, International Computer Technology Conference, the American Society of Mechanical Engineers, San Francisco, CA, Aug. 12-15, 1980, pp. 1-9.
Bejczy, A. et al., A Laboratory Breadboard System for Dual-Arm Teleoperation, SOAR '89 Workshop, JSC, Houston, Jul. 25-27, 1989.
Bejczy, A. et al., Universal Computer Control System (UCCS) for Space Telerobots, Jet Propulsion Laboratory, California Institute of Technology, Pasadena, CA, pp. 317-324, 1987.
Bjork, S. et al., An Alternative to Scroll Bars on Small Screens, Play: Applied Research on Art and Technology, Viktoria Institute, Box 620, SE-405 30 Gothenburg, Sweden, pp. 1-2, 1999.
Bouguila, L. et al., Effect of Coupling Haptics and Stereopsis on Depth Perception in Virtual Environment, Precision and Intelligence Laboratory, Tokyo Institute of Technology, 4259 Nagatsuta cho Midori ku Yokohama shi 226-8503-Japan, 2000.
Brooks. T. et al., Hand Controllers for Teleoperation: A State-of-the-Art Technology Survey and Evaluation, 1985, NASA Jet Propulsion Laboratory, California Institute of Technology, Pasadena, CA.
Burdea, G. et al., Distributed Virtual Force Feedback, IEEE Workshop on "Force Display in Virtual Environments and its Application to Robotic Teleoperation," May 2, 1993, Atlanta, GA.
Calder, B. et al., Design of a Force-Feedback Touch-Inducing Actuator for Teleoperator Robot Control, Submitted to the Department of Mechanical Engineering and Electrical Engineering in partial Fulfillment of the requirements of the degree of Bachelors of Science in Mechanical Engineering and Bachelor of Science in Electrical Engineering at the Massachusetts Institute of Technology, May 1983.
Caldwell, D. et al., Enhanced Tactile Feedback (Tele-Taction) using a Multi-Functional Sensory System, Dept. of Electronic Eng., University of Salford, Salford, M5 4WT, UK, 1993.
Cyberman Technical Specification, Logitech Cyberman SWIFT Supplement, Revision 1.0, Apr. 5, 1994, pp. 1-29.
Eberhardt, S. et al., OMAR-A Haptic Display for Speech Perception by Deaf and Deaf-Blind Individuals, IEEE Virtual Reality Annual International Symposium, Sep. 18-22, 1993, Seattle Washington.
Eberhardt, S. et al., Inducing Dynamic Haptic Perception by the Hand: System Description and Some Results, Dynamic Systems and Control, 1994, vol. 1, presented at 1994 International Mechanical Engineering Congress and Exposition, Chicago Illinois, Nov. 6-11, 1994.
Fukumoto. M. et al., Active Click Tactile Feedback for Touch Panels, NTT DoCoMo Multimedia Labs, Japan, 2001.
Gobel, M. et al., Tactile Feedback Applied to Computer Mice, International Journal of Human-Computer Interaction, vol. 7, No, 1, pp. 1-24, 1995.
Gotow, J. et al., Controlled Impedance Test Apparatus for Studying Human Interpretation of Kinesthetic Feedback, the Robotics Institute and Deptartmetn of Mechanical Engineering, Carnegie Mellon University, Pittsburgh, PA 15213, pp. 332-337, 1989.
Hansen, W., Enhancing Docuemtns with Embedded Programs: How Ness extends Insets in the Andrew Toolkit, 1990. Information Technology Center, Carnegie Mellon University, Pittsburgh, PA 15213.
Hasser, C. et al., Tactile Feedback with Adaptive Controller for a Force-Reflecting Haptic Display Part 1: Design, 1996, Armstrong Laboratory, Human Systems Center, Air Force Materiel Command, Wright-Patterson AFB OH 45433.
Hasser. C. et al., Tactile Feedback for a Force-Reflecting Haptic Display, Thesis Submitted to the School of Engineering of the University of Daytona, Dayton OH, Dec. 1995.
Hasser, C., Force-Reflecting Anthropomorphic Hend Masters, Crew Systems Directorate Biodynamics and Biocommunications Division, Wright-Patterson AFB OH 45433-7901, Jul. 1995, Interim Report for the Period Jun. 1991-Jul. 1995.
Hinckley, K. et al., Haptic Issues for Virtual Manipulation, a Dissertation presented to the Faculty of the School of Engineering and Applied Science at the University of Virginia, in Partial Fulfillment of the Requirement for the Degree Doctor of Philosophy (Computer Science), Dec. 1996.
Howe, R., A Force-Reflecting Teleoperated Hand System for the Study of Tactile Sensing in Precision Manipulation, Proceedings of the 1992 IEEE Conference in Robotics and Automation, Nice, France-May 1992.
Iwata, H., Pen-Based Haptic Virtual Environment, Institute of Engineering Mechanics, University of Tsukuba, Japan, 1993.
Jacobsen, S. et al., High Performance, Dextrous Telerobotic Manipulator with Force Reflection. Intervention/ROV '91, Conference & Exposition, May 21-23, 1991, Hollywood, FL.
Johnson, A., Shape-Memory Alloy Tactical Feedback Actuator, Phase I-Final Report, Air Force SABIR Contract F33-88-C-0541, Armstrong Aerospace Medical Research Laboratory, Human Systems Division, Air Force Systems Command, Wright-Patterson Air Force Base, OH 45433, 1990.
Jones, L. et al., A Perceptual Analysis of Stiffness, Experimental Brain Research, 1990, vol. 79, pp. 150-156.
Kaczmarek, K. et al., Tactile Displays, Virtual Environment Technologies, pp. 349-414, 1995.
Kelley, A. et al., MagicMouse: Tactile and Kinesthetic Feedback in the Human-Computer Interface using an Electromagnetically Actuated Input/Output Device, Department of Electrical Engineering, University of British Columbia, Canada, Oct. 19, 1993.
Lake, S.L., Cyberman from Logitech, web site at http://www.ibiblio.org/GameBytes/issue21/greviews/cyberman/html, as available via the Internet and printed May 29, 2002.
MacLean, K., Designing with Haptic Feedback, Interval Research Corporation, 1801 Page Mill Road, Palo Alto, CA 94304, 2000.
Mine, M., Isaac, A Virtual Environment Tool for the Interactive Construction of Virtual Worlds, Department of Computer Science, University of North Carolina Chapel Hill, 1995.
Picinbono, G. et al., Extrapolation: A Solution for Force Feedback, Virtual Reality and Prototyping, Jun. 1999, Laval, France.
Wloka, M., Interacting with Virtual Reality, Science and Technology Center for Computer Graphics and Scientific Visualization, Brown University Site. Department of Computer Science, 1995.
eRENA, Pushing Mixed Reality Boundaries, Deliverable 7b.1, Final, Version 1.0, 1999.
Real Time Graphics, the Newsletter of Virtual Environment Technologies and Markets, Aug. 1998, vol. 7, No. 2.
1998 IEEE International Conference on Robotics and Automation, May 16-20, 1998, Lueven, Belgium.
Office Action, U.S. Appl. No. 10/116,237 mailed Jun. 30, 2003.
Office Action, U.S. Appl. No. 10/116,237. mailed Dec. 2, 2003.
Office Action, U.S. Appl. No. 11/445,522, mailed Feb. 2, 2007.
Office Action, U.S. Appl. No. 11/445,522, mailed May 2, 2007.
Office Action, U.S. Appl. No. 11/445,522, mailed Oct. 10, 2007.
Patent Cooperation Treaty, International Search Report, International Application No. PCT/US03/10173, mailed Nov. 17, 2003.

* cited by examiner

US 8,917,234 B2

PRODUCTS AND PROCESSES FOR PROVIDING FORCE SENSATIONS IN A USER INTERFACE

RELATED APPLICATIONS AND CLAIM PRIORITY

This application claims priority to U.S. Provisional Application No. 60/419,024, filed Oct. 15, 2002, the priority benefit of which is claimed by this application and which is incorporated in its entirety herein by reference.

FIELD OF THE INVENTION

The invention generally relates to products and processes for providing haptic feedback.

BACKGROUND

Tactile cues and feedback enhance the human-machine interface. Providing tactile feedback increases the amount of information available to a user in the operation of a device. Some devices utilize structural tactile methods. One such example is to provide a raised surface on an input surface, e.g., keypad, of the device. Such methods, however, are inherently static, and thus, cannot offer a wide array of, or effective, tactile feedback. Whereas before, one had to rely solely on aural, visual cues, and/or structural tactile cues, active methods of tactile feedback, i.e., haptics, increasingly provide greater and more effective physical cues to users of various devices.

Enhancing the functionality of a device with haptics, however, generally requires additional processor memory and speed. Moreover, enhancing a device with haptics may further complicate design considerations by placing demands on space constraints, especially where manufacturers of such devices, to satisfy consumer demands, strive to reduce the physical size of devices while increasing device functionality.

In a one-dimensional environment, one may select an item from a set of items, e.g., a list of names, by using a "detent" effect, where each item in the item set can be rendered or mapped to a single detent in a one-dimensional device. In a two-dimensional environment, one may select an item in horizontal or vertical directions. Therefore, one may speak of two-dimensional detents, also referred to as matrix-detents.

To create a haptic effect with a single effect located at different locations on a workspace, or interface area (such as for example, a keypad), it is known to create all those haptic effects in the device, and play them each cycle. A shortcoming of this known approach is that to create a two-dimensional detent, more than one effect has to be created. This, in turn, demands more on the communications bandwidth, as well as more memory and computational time on an embedded system, i.e., a system disposed on or within a device or system. Some applications are not well-suited for communicating an amount of traffic demanded by the known approach.

SUMMARY OF THE INVENTION

The invention provides products and processes for providing haptic feedback in a user interface device. In one exemplary embodiment, a single effect can be repeated at several locations in a matrix. One process according to the present invention comprises defining a first cell comprising a first parameter representing a first haptic effect, mapping a first location of a matrix with the defined first cell, and mapping a second location of the matrix with the defined first cell.

In another embodiment, a process comprises providing a cell comprising an arc and first and second edges. The cell forms a wedge of a switch. The process also comprises providing a plurality of force vectors within the cell and delimiting a corner of the wedge. The force vectors are directed radially toward the first and second edges. The corner is formed by the first and second edges.

In another exemplary embodiment, an apparatus comprises a first primary channel disposed about a first axis, a second primary channel disposed about a second axis, a first secondary channel disposed proximate to the first primary channel, and a second secondary channel disposed proximate to the second primary channel.

These exemplary embodiments are mentioned not to limit the invention, but to provide an example of an embodiment of the invention to aid understanding. Exemplary embodiments are discussed in the Detailed Description, and further description of the invention is provided there. Advantages offered by the various embodiments of the present invention may be understood by examining this specification.

BRIEF DESCRIPTION OF THE DRAWINGS

The accompanying drawings, which constitute part of this specification, help to illustrate embodiments of the invention. In the drawings, like numerals are used to indicate like elements throughout.

DETAILED DESCRIPTION

Embodiments of the present invention include products and processes for providing haptic feedback in a user interface device. In some interface devices, cutaneous feedback (such as, without limitation, vibration, texture, and heat), is also provided to the user, in addition to kinesthetic feedback (such as, without limitation, forces or resistances sensed by muscles, tendons, and/or joints) both subsumed under the phrase, and more generally known collectively as, "haptic feedback." The present invention may be embodied in handheld devices, such as mobile phones, personal digital assistants ("PDAs"), camcorders, and other devices, such as control knobs and computer mice and joysticks.

Figure 1:
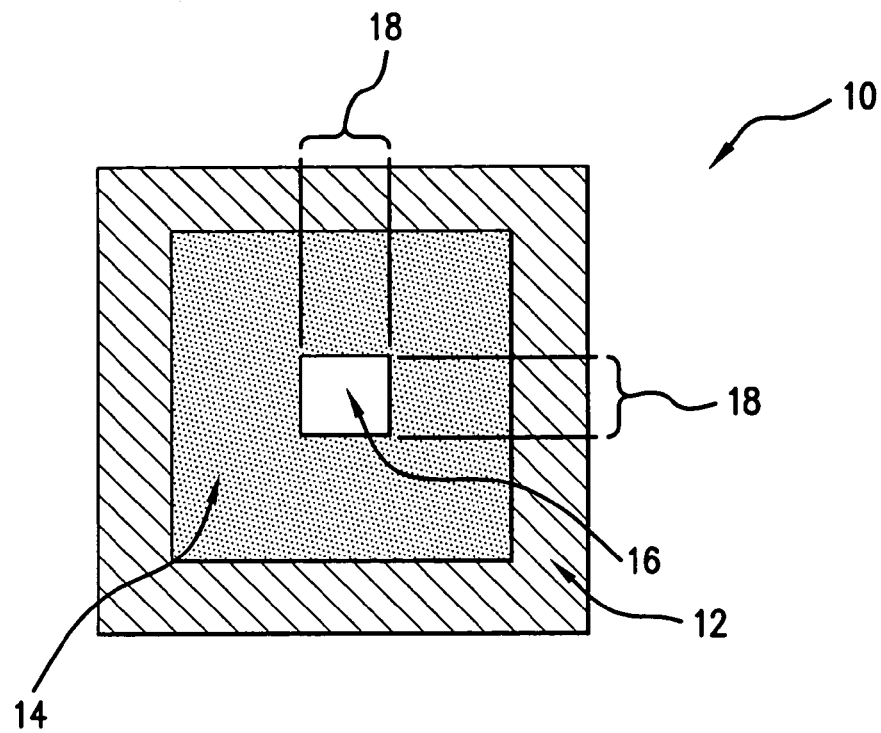
FIG. 1 is a schematic drawing of a cell according to an embodiment of the present invention.

Referring now to FIG. 1, a two-dimensional cell 10 is shown. As used herein, a cell refers to a memory construct in which parameters represent or define haptic effects. In one embodiment, the cell 10 comprises a plurality of parameters, including a wall 12, a detent 14, a location 16, and a dead-band 18. Preferably, the wall 12 forms a perimeter around the cell 10. Typically, the wall 12 is a high-force constraining or defining a physical boundary of the cell 10.

In one embodiment, the detent 14 is a haptic effect, including, but not limited to, a kinesthetic force profile directing a user toward the location 16. Alternatively, the force profile of the detent 14 directs a user away from the location 16. Various haptic effects can be used for the force profiles of the detent 14. Examples of various haptic effects are described in U.S. Pat. Nos. 6,169,540 and 6,285,351, assigned to the assignee of the present invention and incorporated in their entirety herein by reference.

In general, the location 16 represents a physical area of the cell 10 where a haptic effect is disposed. In one embodiment, the dead-band 18 comprises a physical area of the cell 10 in which no forces are present. The dead-band 18 represents a stable position in the cell 10. As shown in FIG. 1, the dead-band 18 includes a horizontal component as well as a vertical component. Alternatively, other suitable parameters for and arrangements of the cell 10 can be used.

Figure 2:
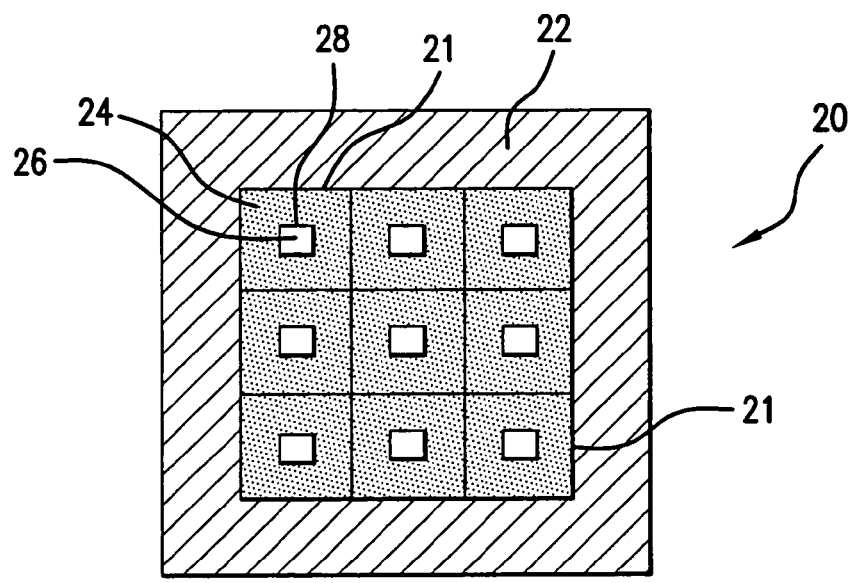
FIG. 2 is a schematic drawing of a matrix of the cell of FIG. 1.

Referring now to FIG. 2, a matrix 20 of cells 21 is shown. Preferably, the matrix 20 is a two-dimensional configuration of the cell 10 described above. The size of the matrix 20 is defined by the number of rows and columns. Although a three-by-three ("3×3") matrix is shown, other suitable arrangements can be used. Preferably, a repeated single haptic effect is repeated at multiple locations arranged in the matrix 20. Alternatively, different cells having different haptic effects can be arranged in the matrix 20, including an arrangement of active and inactive cells. Other suitable cells and arrangements of cells can be used.

Preferably, the matrix 20 comprises cells similar to that described above with reference to the cell 10. That is, the cells 21 each comprise parameters including a detent 24, a location 26, and a dead-band 28. However, unlike the cell 10, each of the cells 21 do not have a wall. Rather, a wall 22 defines a perimeter of the matrix 20, rather than defining each cell 21. Alternatively, other suitable cells, arrangements of cells, and cell parameters can be used.

Figure 3:
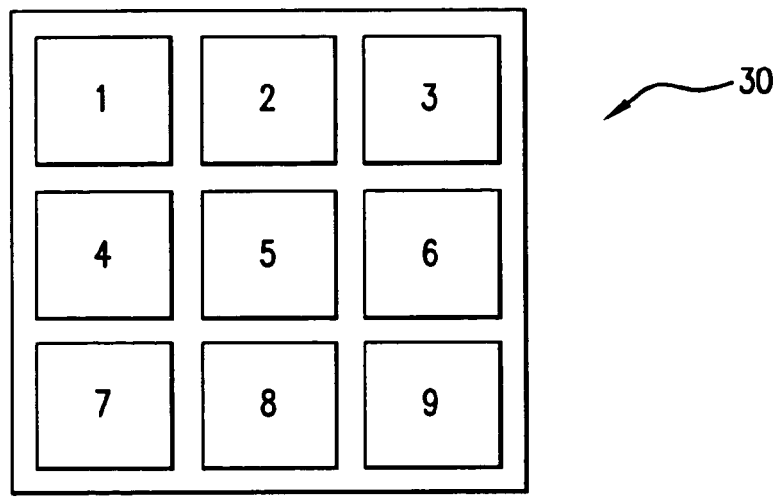
FIG. 3 is a schematic drawing of a device employing the principles of the invention.

Referring now to FIG. 3, a keypad 30 of an interface device (not shown) employing the principles of the invention is shown. In one embodiment, the keypad 30 can be disposed in a mobile telephone. In another embodiment, the keypad 30 can be disposed in a PDA. Alternatively, the keypad 30 can be used in other suitable embodiments, including in a graphical user interface ("GUI").

The numerals of the keypad 30 correspond substantially to location 26 of the matrix 20 shown in FIG. 2. Thus, a cursor in a GUI or a finger (or other digit) of or a stylus used by a user is guided by the different parameters, i.e., the wall 22, detent 24, and dead-band 28, to the center, i.e., location 26, of each cell of the device. Alternatively, the parameters can be used to guide one away from a specific point or area (not shown) on a device.

Figure 4:
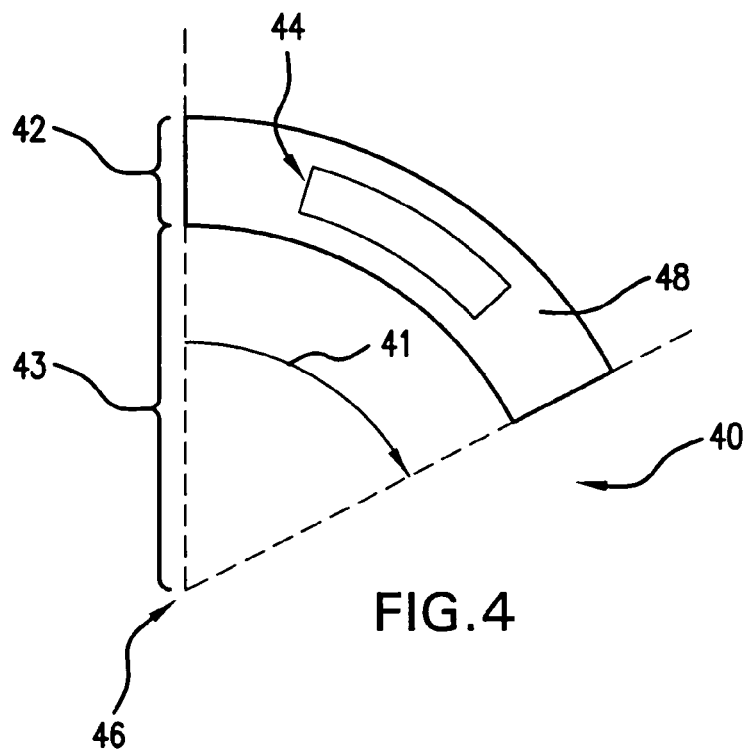
FIG. 4 is a schematic drawing of a cell according to another embodiment of the invention.

Referring now to FIG. 4, a cell 40 according to another embodiment of the invention is shown. The cell 40 is preferably defined by a radius and an arc, depending on the configuration of a particular device. A width 41 (measured in degrees) of the cell 40 is measured as an angle. A detent 48 is defined by a height and the width 41. An angular dead-band 44 is disposed within the area defining detent 48. A matrix dead-band 43 is disposed between a location 46 and the height 42.

The parameters of the cell 40 are similar to that described above with reference to the cell 10. Thus, the location 46 comprises a haptic effect, the detent 48 comprises a force profile, and the matrix and angular dead-bands 43,44 lack any discernable force profile.

Figure 5:
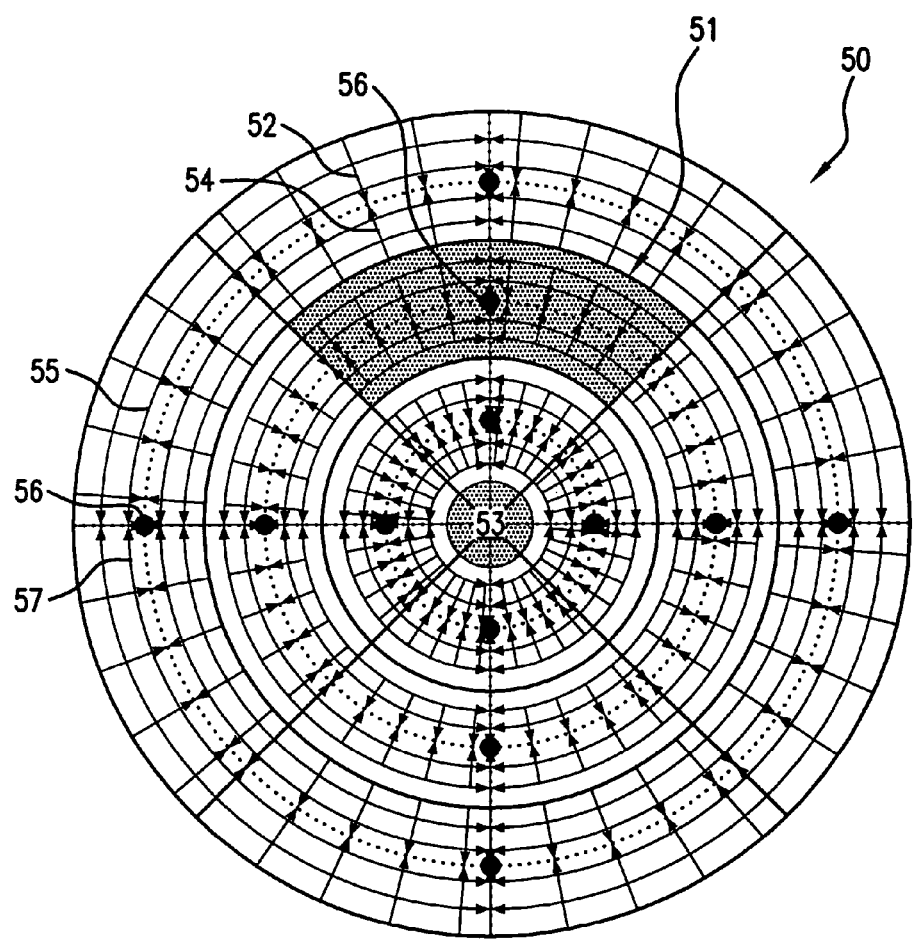
FIG. 5 is a schematic drawing of a matrix of the cell of FIG. 4.

Referring now to FIG. 5, a matrix 50 of cells 51 is shown. The matrix 50 is a two-dimensional configuration of the cell 40 described above. The matrix 50 is a 3×4 circular matrix, which is defined as including three rings along the radius of the circle and four quadrants of the circle. Alternatively, other suitable numbers of rings can be used. Also alternatively, rather than dividing the circle into four equally-sized quadrants, the circle can be divided into any other suitable number of wedges (i.e., portions of the circle defined by the radius and an arc).

Each cell 51 comprises a matrix dead-band 53, a first radial force 52, a second radial force 54, a first tangential force 55, a second tangential force 57, and a stable location 56. A wall (not shown) can be disposed surrounding the cell 51. Alternatively, other suitable cells, arrangements of cells, and cell parameters can be used. The matrix 50 can be used in suitable interface devices (not shown), such as a mobile phone, PDA, or GUI.

The first and second radial forces 52,54 are disposed radially within each cell 51. The first and second radial forces 52,54 are equal and opposite to one another. The intersection of the first and second radial forces 52,54 create a stable position along a radius.

The first and second tangential forces 55,57 are disposed tangentially within each cell 51. The first and second tangential forces 55,57 are equal and opposite to one another. The intersection of the first and second tangential forces 55,57 create a stable position along an arc. The intersection of the first and second radial forces 52,54 and the first and second tangential forces 55,57 creates a stable location 56. There is no force profile at stable location 56. The combination of first and second radial forces 52,54, first and second tangential forces 55,57, and matrix dead-band 53 can be used to guide a user toward a particular location of the matrix 50, and thus, the device.

Figure 6:
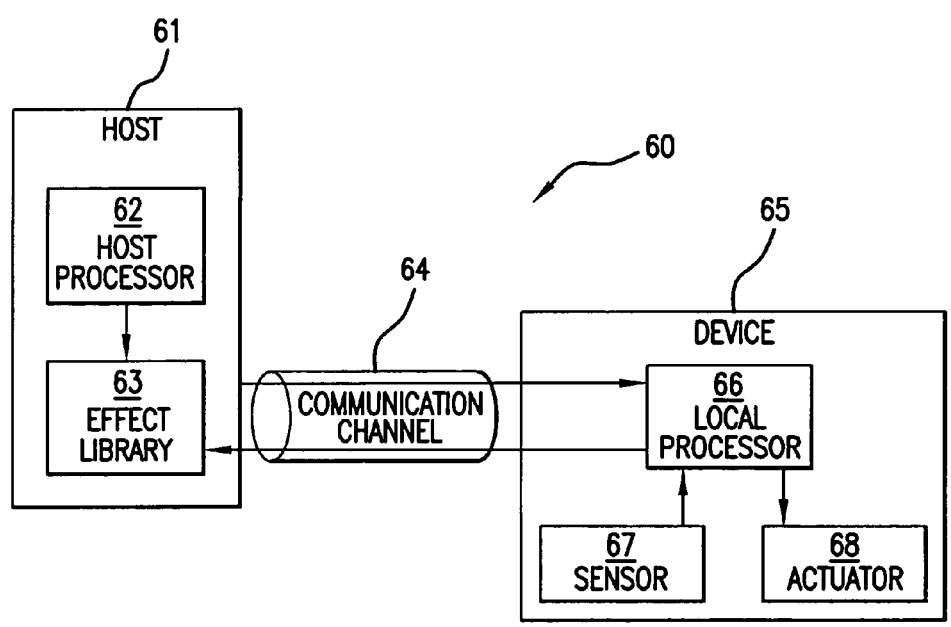
FIG. 6 is a schematic drawing of a system according to an embodiment of the invention.

Referring now to FIG. 6, a schematic drawing of a system 60 implementing an embodiment of the invention is shown. The system 60 comprises a host 61, a communications channel 64, and a device 65. The host 61 comprises a host (or first) processor 62 and an effect library 63. The host 61 is located in a suitable location according to the needs of the device 65. Preferably, the host 61 is located remotely from the device 65. The host 61 is in communication with the device 65 through the communication channel 64. The communication channel 64 connects the host 61 and the device 65 through direct, indirect, wireless, or other suitable means.

The host processor 62 can be a computer or any other suitable processor, such as for example, digital logic processors capable of processing input, excuting algorithms, and generating output as needed. Such processors can include a microprocessor, an Application Specific Integrated Circuit (ASIC), and state machines. Such processors include, or can be in communication with media, for example computer readable media, which stores instructions that, when executed by the processor, cause the processor to perform the steps described herein as carried out, or assisted, by a processor.

One embodiment of a suitable computer-readable medium includes an electronic optical, magnetic, or other storage or transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, configured processor, all optical media, all magnetic tape or other magnetic media, or any other medium from which a computer processor can read.

The host controller 62 is in communication with the effect library 63. The effect library 63 stores instructions for a variety of haptic effects. Preferably, the host controller 62 controls the effect library 63. In one embodiment, the host controller 62 communicates instructions to the effect library 63 to communicate a particular haptic effect to the device 65. As described above, the instructions for a particular haptic effect are communicated from the host 61 to the device 65 through the communications channel 64.

The device 65 comprises a local (or second) processor 66, a sensor 67, and an actuator 68. Preferably, the local processor 66 is embedded in (i.e., disposed within) the device 65. Alternatively, the local processor 66 is located in any other suitable location. The local processor 66 is operable to receive and executions received from the host processor 62. Generally, the local processor 66 is also operable to execute instructions autonomously of the host processor 62. Where the local processor 66 is embedded in the device 65, the local processor 66 generally is more limited in size, and thus computational power, than the host processor 62. Notwithstanding the limitations in size and computational power, the local processor 66 is preferably similar to that described above with reference to the host processor 62.

The local processor 66 is in communication with a sensor 67. The sensor 67 can be a single sensor or a plurality of sensors. The sensor 67 is operable to detect a wide variety of conditions, such as, but not limited to, position, pressure, motion, direction, displacement, and changes or deviations in such conditions. The information detected by the sensor 67 is communicated to the local processor 66, which then processes this information and/or communicates the information received from the sensor 67 to the host controller 62 via the communication channel 64.

The local processor 66 is also in communication with an actuator 68. The actuator 68 can be a single actuator or a plurality of actuators. The actuator 68 is operable to receive instructions (i.e., an actuation signal) from the local processor 66 and to output haptic feedback to the device 65. The local processor 66 can vary at least one of frequency, waveform, and magnitude of the actuation signal.

Suitable structures that can provide haptic feedback and that can produce a plurality of distinct haptic sensations, include, but are not limited to, a voice coil and a permanent magnet, rotating masses, a piezo material, such as quartz, Rochelle Salt, and synthetic polycrystalline ceramics, piezoelectric ceramics, piezoelectric films, and electroactive polymers. Alternatively, other suitable actuators can be used.

While system 60 is shown with first and second processors 62,66, an alternate embodiment comprises a single processor (not shown). For example, a stand-alone device can perform the tasks of both first and second processors 62,66. Thus, in this alternate embodiment, the communication channel 64 would be implemented in software rather than hardware as described in the embodiment above with reference to FIG. 6.

Figure 7:
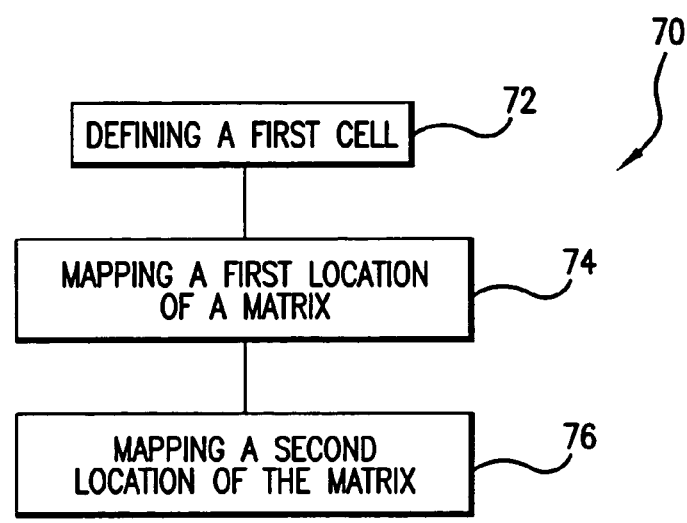
FIG. 7 is a block diagram of a method according to an embodiment of the invention.

Referring now to FIG. 7, a block diagram of a method 70 according to an embodiment of the invention is shown. FIG. 7 shows an embodiment of a method that may be used to generate a matrix of cells, as described above. However, the method 70 may be used to form alternate matrices or cells. Items shown above in FIGS. 1-6, as well as the accompanying description above, are referred to in describing FIG. 7 to aid understanding of the embodiment of the method 70 shown. Thus, the method 70 is not limited to the embodiments described above and with reference to FIGS. 1-6.

As indicated by block 72, the method 70 comprises defining a first cell. In one embodiment, the first cell is defined by the first processor. The first cell comprises first parameter representing a first haptic effect. As described above, various haptic effects can be used. In one embodiment, the first cell comprises a first detent.

In one embodiment, the method 70 comprises communicating the defined first cell from a first processor to a second processor. In another embodiment, the defined first cell is communicated from the first processor to the second processor via a communication channel. In one embodiment, the communication channel is a wireless interface.

As described above, the first processor can be a host processor and the second processor can be a local processor embedded in a device. In one embodiment, the second processor is disposed remotely from the first processor.

As indicated by block 74, the method 70 comprises mapping a first location of a matrix with the defined first cell. In one embodiment, the second processor maps the first location with the defined first cell. In one embodiment, the matrix comprises a square shape, such as, for example, the 3×3 matrix described above and with reference to FIG. 2. In another embodiment, the matrix comprises a circular shape, such as, for example, the 3×4 circular matrix described above and with reference to FIG. 5. Alternatively, other suitable configurations, shapes, and sizes of matrix can be used.

As indicated by block 76, the method 70 comprises mapping a second location of the matrix with the defined first cell. In one embodiment, the second processor maps the second location with the defined first cell. In another embodiment, the method 70 further comprises defining a second cell. Preferably, the second cell is defined by the first processor. The second cell comprises a second haptic effect. Preferably, the second haptic effect is different than the first haptic effect. Alternatively, the first and second haptic effects can be the same. In one embodiment, the second cell comprises a second detent.

In another embodiment, the method 70 further comprises communicating the defined second cell from the first processor to the second processor. In one embodiment, the defined second cell is communicated from the first processor to the second processor via the communication channel. In one embodiment, the method 70 further comprises mapping a third location of the matrix with the defined second cell by the second processor. In another embodiment, the second cell is an inactive cell, whereas the first cell is an active cell.

In one embodiment, the third location is disposed between the first and second locations. Alternatively, the first and second cells can be disposed in other desired arrangements or configurations. The second processor is operable to arrange the first and second cells in suitable arrangements without instructions from the first processor, thus reducing the amount of communication between the first and second processors, and therefore bandwidth of the communication channel. Thus, multiple effects can be displayed in a two-dimensional device by specifying a limited number of parameters and a desired number of cells in the matrix.

In another embodiment, the method 70 further comprises providing an actuator in communication with the first, second and third locations. The actuator can be similar to that described above. In one embodiment, the actuator comprises a plurality of actuators. Preferably, the actuator is operated to provide a computer-modulated force to the first, second, and third locations. The actuator preferably receives an actuating signal from the second processor. Alternatively, the actuator receives instructions from the first processor.

Figure 8:
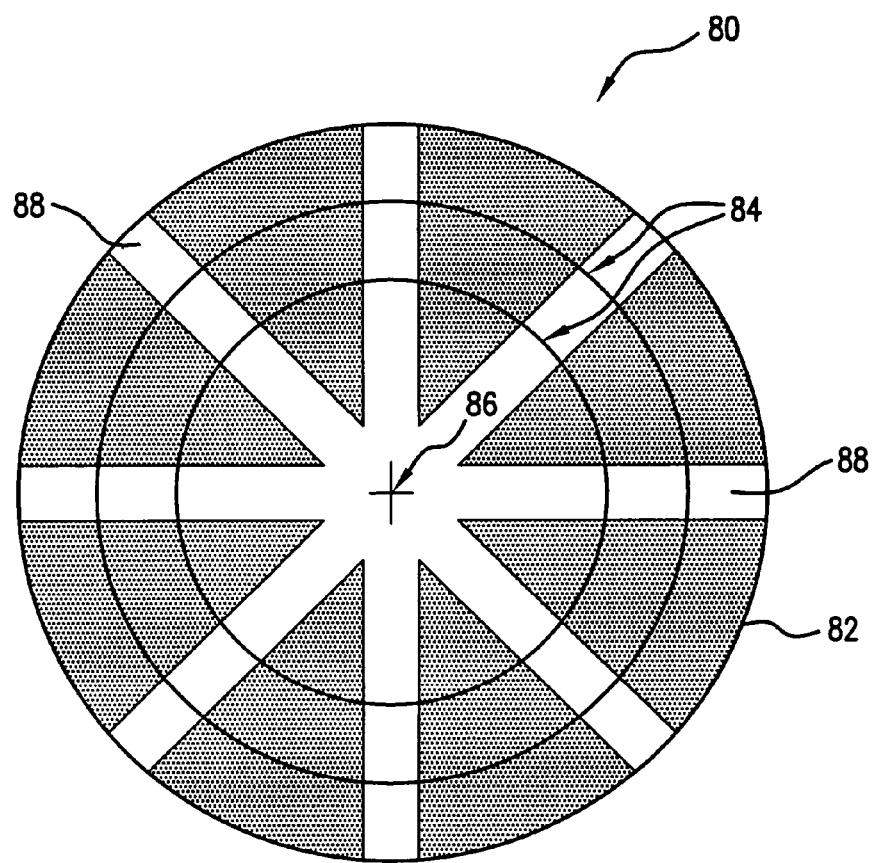
FIG. 8 is a schematic drawing of a prior art switch.
Figure 9:
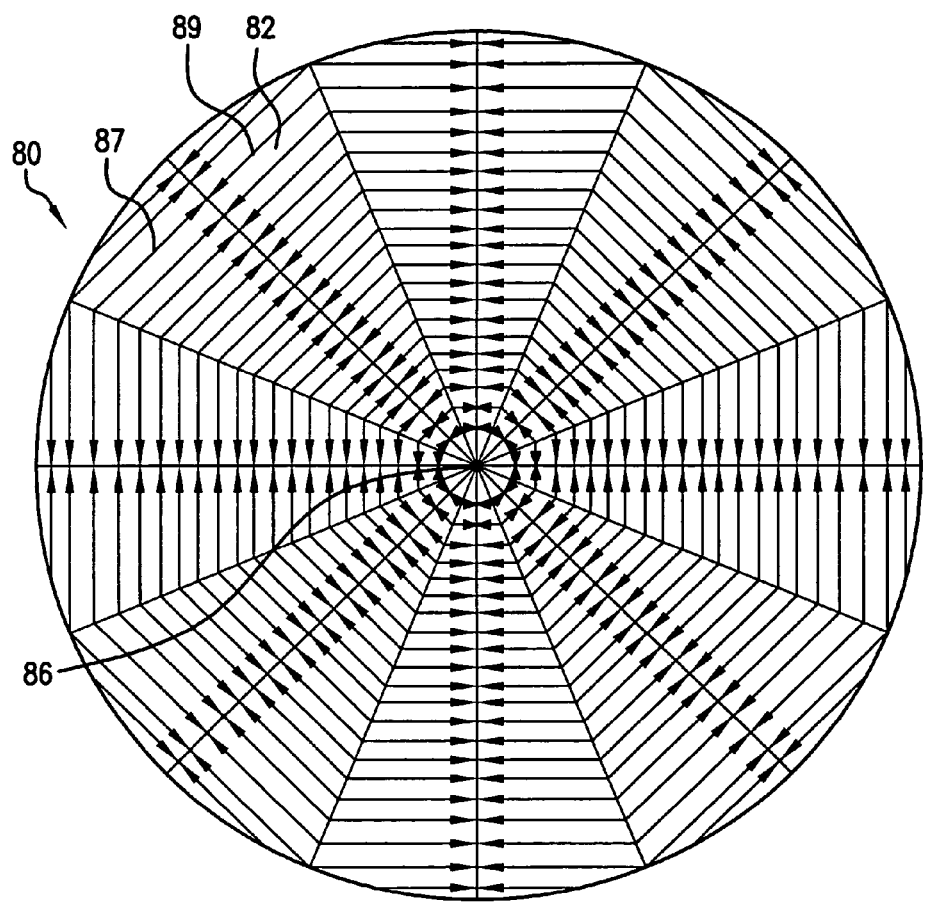
FIG. 9 is another schematic drawing of the prior art switch of FIG. 8.

Referring now to FIGS. 8 and 9, a prior art switch 80 is shown. The prior art switch 80 includes a wall 82, which forms a perimeter around the switch 80. The switch 80 includes a plurality of radial detents 84, a location 86, and a dead-band 88. The switch 80 includes a force profile (see FIG. 9) in separate and equally-sized wedges. The force profile includes first 87 and second 89 cartesian forces. The first and second Cartesian forces 87,89 are equal and opposite forces. The intersection of the first and second Cartesian forces 87,89 form the dead-band 88.

In the force profile of the prior art switch shown in FIG. 9, as one approaches the location 86 disposed in the center of the switch 80 the force profiles proximate to the corners approaching the location 86 exert antagonistic forces on the user, thus, providing incoherent and confusing haptic feedback to the user.

Figure 10:
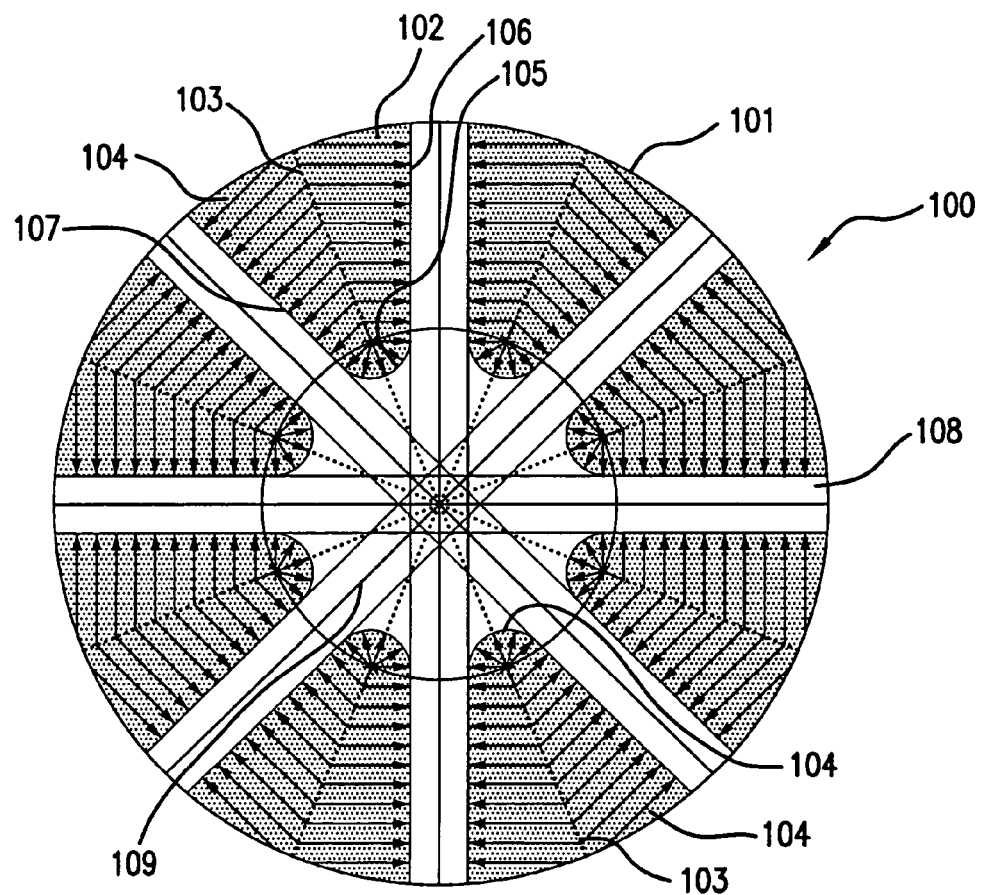
FIG. 10 is a schematic drawing of a switch according to an embodiment of the invention.

Referring now to FIG. 10, a switch 100 according to an embodiment of the invention is shown. The switch 100 comprises a wall 101 forming a perimeter around the switch 100. Preferably, the switch 100 comprises a plurality of cells 104 disposed adjacent to one another. In one embodiment, the switch 100 comprises a plurality of radial detents (not shown). The switch 100 comprises a location 109 and a plurality of dead-bands 108 disposed between the cells 104. In one embodiment, a spring (not shown) is disposed proximate to the location 109. In another embodiment, a centering spring is disposed on top of the switch 100.

Each cell 104 comprises a centerline 103, a corner 105, a first edge 106, and a second edge 107. As shown in FIG. 10, the corner 105 does not extend to the location 109. Further, the corner 105 does not form a sharp edge, but rather a gradual arc. The corner 105 joins first and second edges 106,107. The centerline 103 bisects the cell 104.

Each cell 104 also comprises a force profile (indicated by the vectors). The force profile of each cell 104 is directed outwardly from the centerline 103 toward the first and second edges 106,107 and the corner 105. Thus, the force profile of the switch guides a user toward the dead-bands 108 and the location 109.

Figure 11:
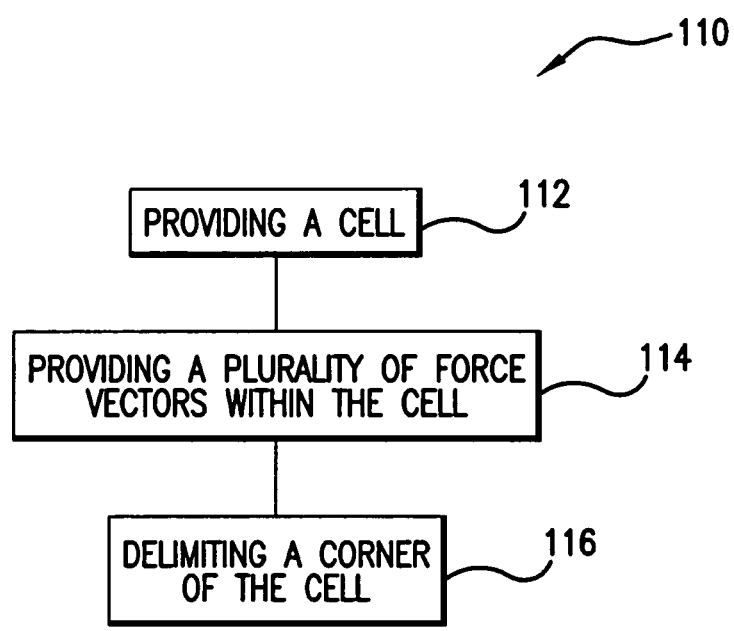
FIG. 11 is a block diagram of a method according to an embodiment of the invention.

Referring now to FIG. 11, a method 110 according to an embodiment of the invention is shown. FIG. 11 shows an embodiment of a method that may be used to make a switch, as described above. However, the method 110 may be used to form alternate switches. Items shown above in FIG. 10, as well as the accompanying description above, are referred to in describing FIG. 11 to aid understanding of the embodiment of the method 110 shown. Thus, the method 110 is not limited to the embodiments described above and with reference to FIG. 10.

As indicated by block 112, the method 110 comprises providing a cell comprising an arc and first and second edges. A plurality of cells form the switch. In one embodiment, the switch comprises a circular shape. In another embodiment, the switch comprises an eight-way switch. The eight-way switch is operable to select a channel about a first axis.

As indicated by block 114, the method 110 comprises providing a plurality of force vectors within the cell. The force vectors are directed radially toward the first and second edges. The force vectors direct a user toward the outside of the cell, i.e., toward a dead-band. As indicated by block 116, the method 110 comprises delimiting a corner of the cell. The corner is delimited by forming an arc joining the first and second edges. Thus, the force profile does not extend completely to a center of the switch. Preferably, the force vectors within the corner are directed toward the center of the switch.

In one embodiment, the method 110 comprises providing a biasing element proximate to the center of the switch. In another embodiment, the method 110 comprises providing a detent proximate to a radius of the switch. Other suitable configurations of switches can be used.

Figure 12:
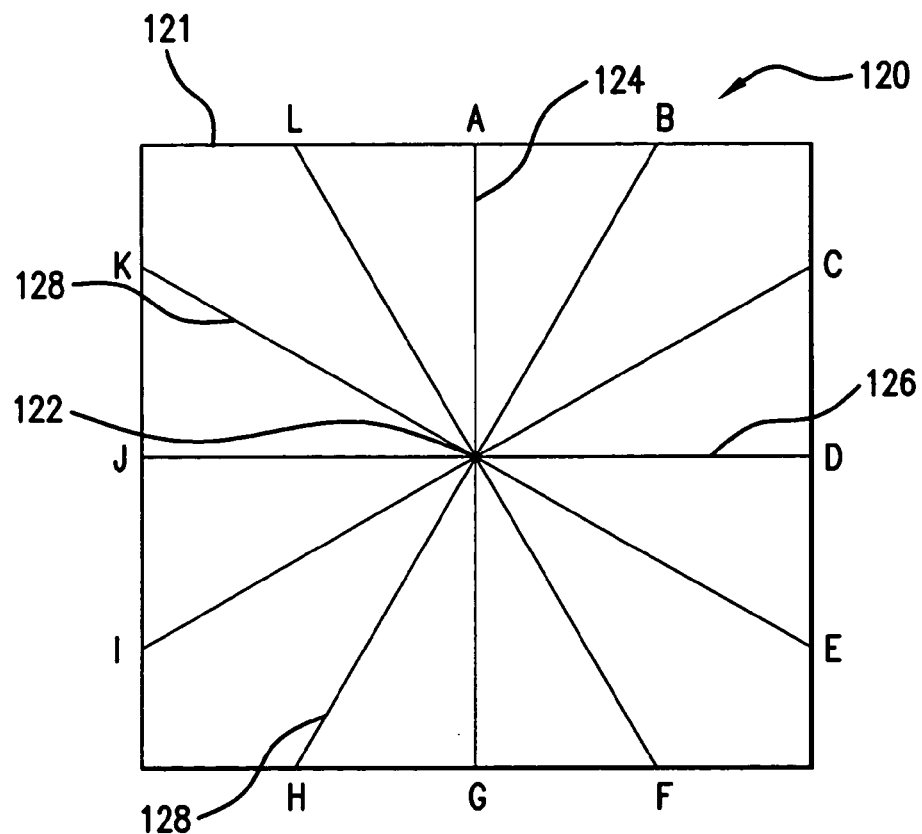
FIG. 12 is a schematic drawing of a prior art switch.

Referring now to FIG. 12, a prior art switch 120 is shown. The switch 120 includes a wall 121, a center 122, a first axis 124, a second axis 126, and a plurality of channels 128. The wall 121 forms a border about the switch 120. The first and second axes 124,126 are orthogonal to one another. The plurality of channels 128 intersect at the center 122 of the switch 120.

The switch 120 shows 12 different channels 128. Each channel is labeled with a letter beginning with the letter "A" and ending with the letter "L." Thus, a user can select up to 12 options (i.e., any letter from A-L) with the switch 120.

Such a switch is referred to as an N-way switch, where "N" refers to the number of channels that can be selected or activated. As the number of choices increases, the more difficult N-way switches become for one to navigate. It is generally easier to select the four cardinal directions than to select channels that are located at angles, especially when the angles are close together. Of course, reducing the size of the switch to accommodate smaller-sized devices adds to the difficulty in navigating the switch.

Figure 13:
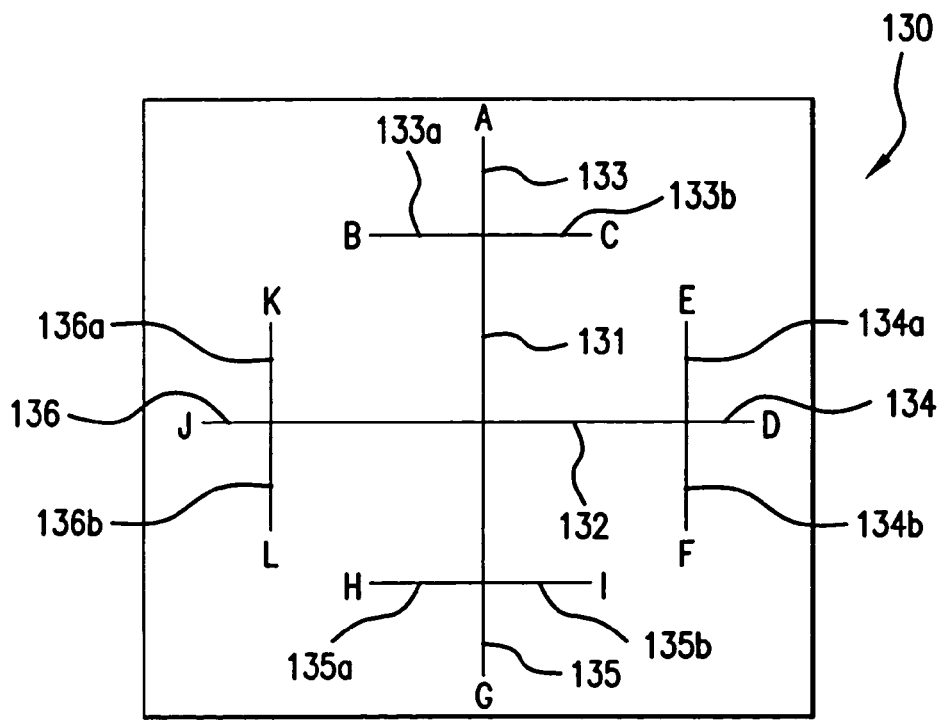
FIG. 13 is a schematic drawing of a switch according to an embodiment of the invention.
Figure 14:
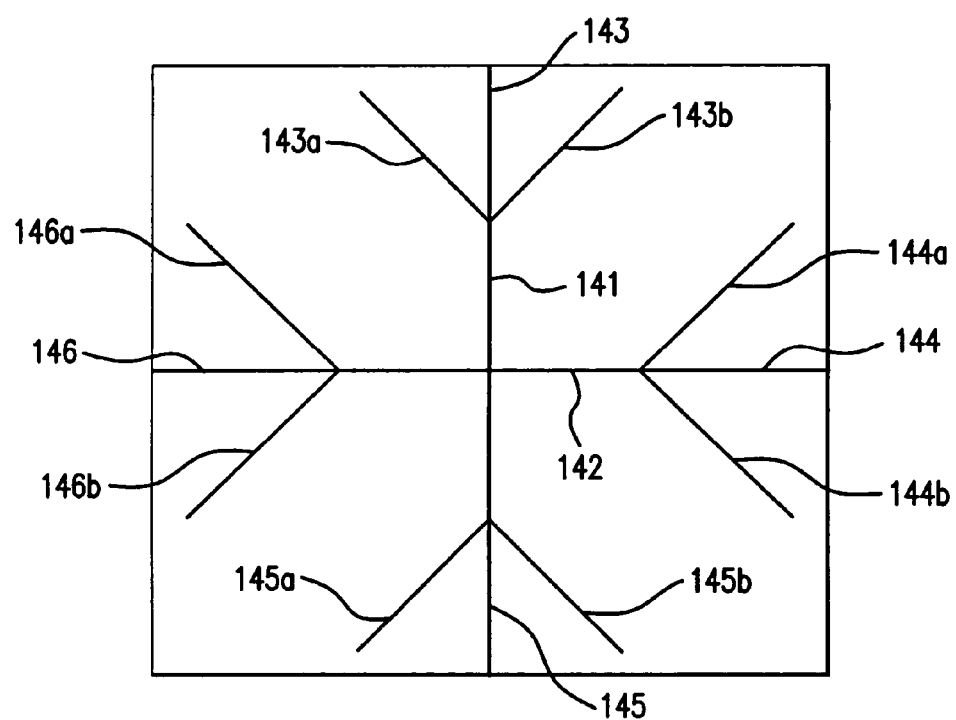
FIG. 14 is a schematic drawing of a switch according another embodiment of the invention.

Referring now to FIGS. 13 and 14, a switch 130 according to an embodiment of the invention is shown. The switch 130 can be referred to as an M×N switch to improve the navigability of a switch. The "M" dimension represents the number of available channels from a center of the workspace. Once one selects an initial or primary channel (generally along a cardinal direction), the "N" dimension offers additional channels to be explored and selected.

For example, each channel of the switch 130 is labeled with the letters "A" through "L." The letters A, D, G, and J are labeled along the "M" dimension, while the "N" dimensions are labeled with the letters B, C, E, F, H, I, K, and L. Thus, a 4×3 switch will offer the same number of options as a 12-way switch. However, the 4×3 switch only requires one to select along the cardinal directions making the task of selecting a channel easier for the user.

For example, to spell the word "ace" using the prior art switch of FIG. 12 would require one to select the channels representing the letters "c" and "e," which are disposed at predetermined angles off of a horizontal or vertical line, something which adds complexity to the task of navigating about the switch. Spelling the word "ace" using the switch of FIG. 13 only requires one to maneuver in a cardinal direction, something which is much simpler to do than in the prior art switch.

Referring again to FIG. 13, the switch 130 comprises a first primary channel 133 disposed about a first axis 131, a second primary channel 134 disposed about a second axis 132. In one embodiment, the first axis 131 is disposed substantially orthogonal to the second axis 132. Alternatively, the first and second axes 131,132 can be disposed in other suitable arrangements.

The switch 130 also comprises a first secondary channel 133a,133b disposed proximate to the first primary channel 133 and a second secondary channel 134a,134b disposed proximate to the second primary channel 134. In one embodiment, the first secondary channel 133a,133b is in communication with the first primary channel 133 and the second secondary channel 134a,134b is in communication with the second primary channel 134.

In one embodiment, the first and second primary channels 133,134 and the first and second secondary channels 133a, 133b,134a,134b are activated by one's touch, i.e., by a digit or device, such as a stylus. Alternatively, the first and second primary channels 133,134 and the first and second secondary channels 133a,133b,134a,134b are activated by depressing the switch 130 causing the switch to pivot about the first and/or second axes 131,132.

In the embodiment shown in FIG. 13, the first secondary channel 133a,133b is disposed substantially orthogonal to the first primary channel 133 and the second secondary channel 134a,134b is disposed substantially orthogonal to the second primary channel 134. In the embodiment shown in FIG. 14, the first secondary channel 143a,143b is disposed obliquely to the first primary channel 143 and the second secondary channel 144a,144b is disposed obliquely to the second primary channel 144.

In one embodiment, the switch 130 further comprises a third primary channel 135 disposed substantially co-axial with the first primary channel 133 and a fourth primary channel 136 disposed substantially co-axial with the second primary channel 134. In another embodiment, the switch 130 further comprises a third secondary channel 135a,135b disposed proximate to the third primary channel 135 and a fourth secondary channel 136a,136b disposed proximate to the fourth primary channel 136. In one embodiment, the third secondary channel 135a,135b is in communication with the third primary channel 135 and the fourth secondary channel 136a,136b is in communication with the fourth primary channel 136.

In one embodiment, the third and fourth primary channels 135,136 and the third and fourth secondary channels 135a, 135b,136a,136b are activated by one's touch. Alternatively, the third and fourth primary channels 135,136 and the third and fourth secondary channels 135a,135b,136a,136b are activated by depressing the switch 130 causing the switch 130 to pivot about the first and/or second axes 131,132.

In the embodiment shown in FIG. 13, the third secondary channel 135a,135b is disposed substantially orthogonal to the first primary channel 135 and the fourth secondary channel 136a,136b is disposed substantially orthogonal to the second primary channel 136. In the embodiment shown in FIG. 14, the third secondary channel 145a,145b is disposed obliquely to the third primary channel 145 and the second secondary channel 146a,146b is disposed obliquely to the second primary channel 146.

Figure 15:
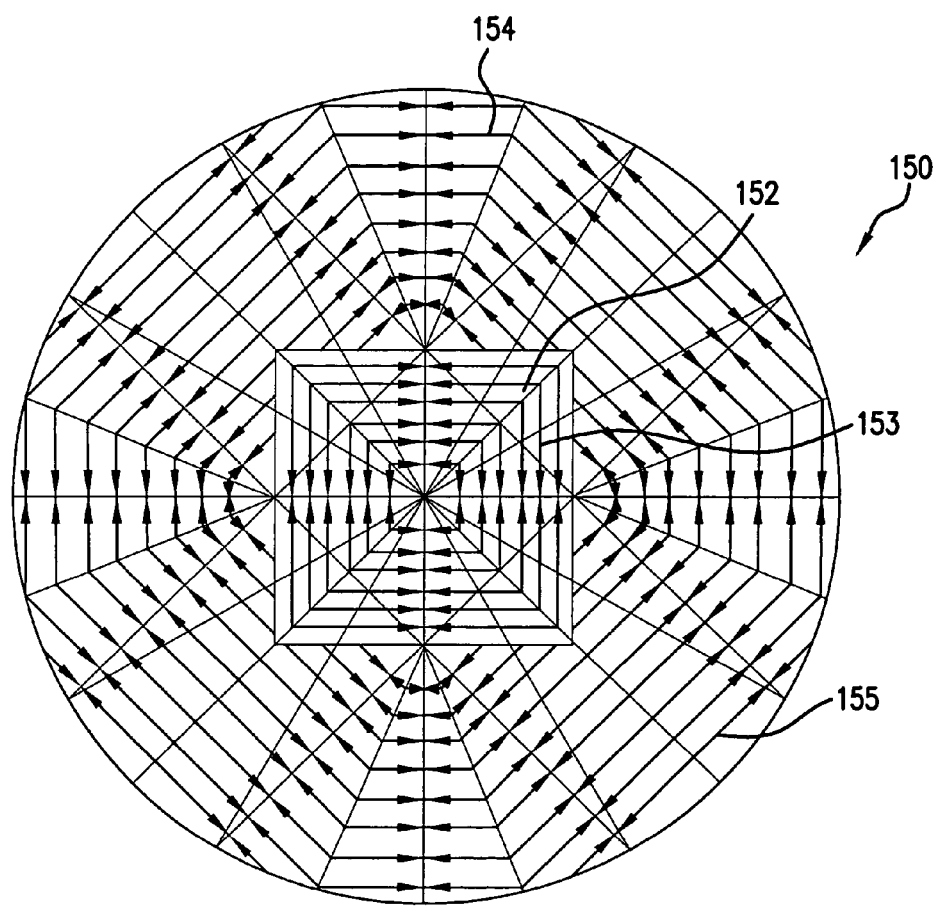
FIG. 15 is a schematic drawing of another switch according to another embodiment of the invention.

Referring now to FIG. 15, a switch 150 is shown. The switch 150 uses a 4-way switch 152 inside a circular switch 154 having 12 cells or channels. The 4-way switch 152 is similar to the embodiments described above and shows a force profile 153. The 4-way switch 152 allows one to access directly only four cells, after which one can select any of the 12 channels of the circular switch 154. The circular switch 154 shows a force profile 155, as previously described above. Thus, such an embodiment would be referred to as a 4×12 switch, and would provide one with a choice of 48 options. Other suitable variations of the arrangements and configurations of the embodiments described are possible.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed:

1. A method comprising:
defining a graphical user interface having a plurality of graphical input elements arranged in a matrix configuration;
defining a first cell, the first cell comprising a first parameter representing a first haptic effect;
assigning the first cell to a first graphical input element in the matrix configuration;
assigning the first cell to a second graphical input element in the matrix configuration;
receiving a sensor signal from a sensor, the sensor configured to detect a movement of a user manipulatable object of an interface device and the sensor signal associated with the movement;
determining a position of a graphical object based at least in part on the sensor signal;
determining an interaction between the position of the graphical object and at least one of the plurality of graphical input elements; and
outputting the first haptic effect based at least in part on the first parameter and the interaction, the haptic effect configured to resist or assist the movement of the user manipulatable object.

2. The method of claim 1, further comprising communicating the first cell from a first processor to a second processor.

3. The method of claim 2, further comprising:
defining a second cell, the second cell comprising a second parameter representing a second haptic effect;
communicating the second cell from the first processor to the second processor; and
assigning the second cell to a third input element in the matrix configuration.

4. The method of claim 3, wherein the first and second cells are defined by the first processor and the first, second, and third input elements are assigned by the second processor.

5. The method of claim 3, wherein the third input element is disposed between the first and second input elements.

6. The method of claim 1, wherein the first cell comprises a first detent and the second cell comprises a second detent.

7. The method of claim 3, further comprising providing an actuator in communication with the first, second, and third input elements, the actuator operable to provide a computer-modulated force to the first, second, and third input elements.

8. The method of claim 2, wherein the second processor is disposed remotely from the first processor.

9. The method of claim 1, wherein the matrix configuration comprises a square shape.

10. The method of claim 1, wherein the matrix configuration comprises a circular shape.

11. The method of claim 1, wherein the first cell comprises an arc and first and second edges; and wherein the haptic effect comprises a plurality of force vectors within the first cell, the force vectors directed outward from a centerline of the first cell toward the first and second edges.

12. A switch comprising:
a sensor;
an actuator configured to output a haptic effect; and
a processor in communication with the sensor and the actuator, the processor configured to receive a sensor signal from the sensor, and to cause the actuator to generate a haptic effect based at least in part on the sensor signal, wherein the haptic effect is based on a plurality of detents defining:
a first primary channel defined along a first axis,
a second primary channel defined along a second axis, a first secondary channel proximate to the first primary channel, and a second secondary channel proximate to the second primary channel, the plurality of detents configured to substantially constrain movement of an interface device to one of the first primary channel, the second primary channel, the first secondary channel, or the second secondary channel, wherein:

each channel is a substantially one-dimensional channel, the first primary channel intersects the second primary channel, the first secondary channel intersects one of the first or second primary channel, and the second secondary channel intersects one of the first or second primary channels or the first secondary channel.

13. The switch of claim 12, wherein the switch comprises a circular shape.

14. The switch of claim 12, wherein the switch comprises an eight-way switch, the eight-way switch operable to select a channel about a first axis.

15. The switch of claim 12, further comprising providing a biasing element proximate to a center of the switch.

16. The switch of claim 12, further comprising providing a detent proximate to a radius of the switch.

17. The switch of claim 12, further comprising:

a third primary channel defined substantially co-axial with the first primary channel;

a fourth primary channel defined substantially co-axial with the second primary channel;

a third secondary channel defined proximate to the third primary channel; and a fourth secondary channel defined proximate to the fourth primary channel.

18. The switch of claim 17, wherein the first axis is substantially orthogonal to the second axis.

19. The switch of claim 17, wherein the third secondary channel is oblique to the third primary channel; and the fourth secondary channel is oblique to the fourth primary channel.

20. The switch of claim 17, wherein the third secondary channel is substantially orthogonal to the third primary channel; and the fourth secondary channel is substantially orthogonal to the fourth primary channel.

21. The switch of claim 12, wherein the first secondary channel is oblique to the first primary channel; and the second secondary channel is oblique to the second primary channel.

22. The switch of claim 12, wherein the first secondary channel is substantially orthogonal to the first primary channel; and the second secondary channel is substantially orthogonal to the second primary channel.

23. A non-transitory computer-readable medium comprising program code, the program code comprising:

program code for defining a graphical user interface having a plurality of graphical input elements arranged in a matrix configuration;

program code for defining a first cell, the first cell comprising a first parameter representing a first haptic effect;

program code for assigning the first cell to a first graphical input element in the matrix configuration;

program code for assigning the first cell to a second graphical input element in the matrix configuration;

program code for receiving a sensor signal from a sensor, the sensor configured to detect a movement of a user manipulatable object of an interface device and the sensor signal associated with the movement;

program code for determining an interaction between the position of the graphical object and at least one of the plurality of graphical input elements; and program code for outputting the first haptic effect based at least in part on the first parameter and the interaction, the haptic effect configured to resist or assist the movement of the user manipulatable object.

24. The non-transitory computer-readable medium of claim 23, further comprising program code for communicating the first cell from a first processor to a second processor.

25. The non-transitory computer-readable medium of claim 24, further comprising:

program code for defining a second cell, the second cell comprising a second parameter representing a second haptic effect;

program code for communicating the second cell from the first processor to the second processor; and program code for assigning the second cell to a third input element in the matrix configuration.

* * * * *